United States Patent
Yoneyama et al.

(10) Patent No.: US 7,995,930 B2
(45) Date of Patent: Aug. 9, 2011

(54) OPTICAL RECEIVER USING MACH-ZEHNDER INTERFEROMETER

(75) Inventors: Mikio Yoneyama, Tokyo (JP); Fumiaki Saitou, Yokohama (JP); Shigeru Ono, Fussa (JP); Yosuke Takeuchi, Yokosuka (JP); Kazushige Yonenaga, Yokosuka (JP); Shoichiro Kuwahara, Yokosuka (JP); Eiji Yoshida, Yokosuka (JP); Yutaka Miyamoto, Tokyo (JP); Hiroto Kawakami, Yokosuka (JP)

(73) Assignees: NTT Electronics Corporation, Tokyo (JP); Nippon Telegraph and Telephone Corporation, Tokyo (JP)

(*) Notice: Subject to any disclaimer, the term of this patent is extended or adjusted under 35 U.S.C. 154(b) by 648 days.

(21) Appl. No.: 12/092,031

(22) PCT Filed: May 19, 2006

(86) PCT No.: PCT/JP2006/310045
§ 371 (c)(1),
(2), (4) Date: Apr. 29, 2008

(87) PCT Pub. No.: WO2007/052380
PCT Pub. Date: May 10, 2007

(65) Prior Publication Data
US 2009/0097867 A1    Apr. 16, 2009

(30) Foreign Application Priority Data
Oct. 31, 2005 (JP) ................................. 2005-317332

(51) Int. Cl.
    *H04B 10/06* (2006.01)
(52) U.S. Cl. ......... 398/208; 398/202; 398/209; 398/210
(58) Field of Classification Search ........... 398/208–210
    See application file for complete search history.

(56) References Cited

U.S. PATENT DOCUMENTS

| 5,228,043 | A  | * | 7/1993  | Naito et al. ............... 372/32 |
| 6,188,499 | B1 | * | 2/2001  | Majima ................... 398/208 |
| 7,200,344 | B1 | * | 4/2007  | Hoshida .................. 398/202 |
| 7,379,671 | B2 | * | 5/2008  | Shimomura et al. ........ 398/92 |
| 7,734,194 | B2 | * | 6/2010  | Yonenaga et al. ......... 398/208 |
| 2003/0231891 | A1 | * | 12/2003 | Kuzukami et al. ......... 398/198 |
| 2010/0172653 | A1 | * | 7/2010  | Yonenaga et al. ......... 398/154 |

FOREIGN PATENT DOCUMENTS

| JP | 05-268162 | 10/1993 |
| JP | 2004-020839 A | 1/2004 |
| WO | WO2005/088876 A1 | 3/2005 |

OTHER PUBLICATIONS

Y. Miyamoto et al., "Novel Modulation and Detection for Bandwidth-Reduced RZ Formats using Duobinary-Mode Splitting in Wideband PSK/ASK Conversion", J. Lightwave Technol., vol. 20, No. 12, pp. 2067-2078, Dec. 2002.

(Continued)

*Primary Examiner* — Ken N Vanderpuye
*Assistant Examiner* — Danny W Leung
(74) *Attorney, Agent, or Firm* — Miles & Stockbridge PC; James T. Carmichael; Otilia Gabor

(57) ABSTRACT

The present invention relates to an optical receiver, in which the transmittance of a Mach-Zehnder interferometer can be locked at a normal operation point in a simple structure and control. A transmittance detecting circuit and a minute modulation signal detecting circuit are provided in parallel after a balanced optical receiver, and a switch is selectively connectable either a minute modulation signal detecting circuit and a transmittance detecting circuit. In the initial stage of frequency pull-in, the switch is set to connect the transmittance detecting circuit to the synchronous detection circuit. If the transmittance detecting circuit detects that the transmittance of the Mach-Zehnder interferometer at the carrier frequency becomes a desired transmittance, the connection of the switch is switched from the transmittance detecting circuit to the minute modulation signal detecting circuit.

13 Claims, 18 Drawing Sheets

OTHER PUBLICATIONS

A. Hirano et al., "Performances of CSRZ-DPSK and RZ-DPSK in 43-Gibit/s/ch DWDMG.652 Single-Mode-Fiber Transmission", Tech. Dig. on OFC2003, ThE4, pp. 454-455.

R.A. Griffin et al., "Optical differential quadrature phase-shift key (oDQPSK) for high capacity optical transmission", OFC2002, WX6, 2002.

Y. Kamio et al., "A study of differential 8-ary PSK for optical communications", Technical Report of IEICE. OSC2004-5, p. 23, 2004.

International Preliminary Report on Patentability dated May 15, 2008.

* cited by examiner

A: UPON CONNECTION OF TRANSMITTANCE DETECTING CIRCUIT
B: UPON CONNECTION OF MINUTE MODULATION SIGNAL DETECTING CIRCUIT

A: UPON CONNECTION OF PHOTOCURRENT MONITORING CIRCUIT
B: UPON CONNECTION OF MINUTE MODULATION SIGNAL DETECTIN

A: UPON CONNECTION OF TRANSMITTANCE DETECTING CIRCUIT
B: UPON CONNECTION OF MINUTE MODULATION SIGNAL DETECTING CIRCUIT (b)

(a)

OPTICAL RECEIVER USING MACH-ZEHNDER INTERFEROMETER

TECHNICAL FIELD

The present invention relates to an optical receiver of an optical communication system using phase-modulated signal light such as a differential phase-shift keying transmission scheme.

BACKGROUND ART

With the arrival of broadband era, demand for larger capacities for optical fiber transmission systems has been increasing. In order to implement a large capacity system, it has been common practice to increase the signal speed for each transmission channel by means of time division multiplexing in an electric stage circuit, and to further improve the transmission capacity by means of wavelength multiplexing in an optical stage. Because of speeding up electric circuits, a wavelength multiplexing system based on the channel speed of 10 Gbit/s is widely used, and a system based on 40 Gbit/s channel is on the verge of implementation.

As a line code for wavelength multiplexing of such a high-speed optical signal, a DPSK (differential phase-shift keying) having one bit for the amount of information per symbol, two-bit DQPSK (differential quadrature phase-shift keying), and three-bit D8PSK (differential 8-phase sift keying) draw attention. These line codes feature that "1"/"0" information is transmitted as information on the phase of light, rather than intensity of light (direct detection). This can not only obtain a high receiver sensitivity, but also has advantages of excellent nonlinear strength and the like, so that its study has been recently active. Further, from a sensitizing standpoint, RZ-DPSK (Return-to-Zero DPSK) in which the phase-modulated optical signal is further subjected to pulsed intensity modulation becomes mainstream. As RZ pulse methods, CSRZ-DPSK (Carrier Suppressed Return-to-Zero DPSK) (see Non-Patent Documents 1 and 2) as a new modulation code in which only a phase p is shifted between adjacent pulses is proposed in addition to the conventional RZ modulation.

The reason why these line codes can attain higher receiver sensitivity characteristics than the direction detection is because a balanced optical receiver is used to improve the signal-to-noise ratio. It can improve a receiver sensitivity of 3 dB compared to the direct detection method. For example, in order to receive a phase-modulated signal at the balanced optical receiver in the DPSK receiver, the phase-modulated signal light is passed through MZI (Mach-Zehnder interferometer) in which a difference corresponding to 1 symbol is inserted during propagation delay time of two optical waveguides as shown in FIG. 28(a). Then, it is demodulated to the intensity modulated signal by interference between the optical phase (0 or p) of the previous symbol and the optical phase of the next symbol to output from the two output ports as a signal "1" or "0". Therefore, as shown in FIG. 28(b), there is a need to mach the carrier frequency and a frequency with which the MZI transmittance becomes the maximum or minimum. FIG. 28(c) shows such a state that the transmittances of carrier frequencies for two ports of output 1 and output 2 are set to maximum (constructive) and minimum (destructive), respectively. In other words, if no phase inversion occurs between adjacent bits of the phase-modulated signal light, the optical signal is output to output 1 as "1", while if phase inversion occurs, it is output to output 2 as "0". Then, the output is received by the balanced optical receiver as an intensity modulation signal.

However, as shown in FIG. 29(a), if the carrier frequency and the MZI transmittance do not match, light to be output to the output 1 by nature is leaked to the opposite output 2, or light to be output to the output 2 by nature is leaked to the output 1 as shown in FIG. 29(b), resulting in reduction in signal light intensity and interference between codes.

In general, MZI, composed of an optical waveguide or optical fiber, can adjust an optical phase difference of light that reaches an optical multiplexing point after passing through each optical path by heating heaters formed on two optical paths. Thus, the transmittance can be sifted on an optical frequency axis. Therefore, the application of heat to the heater, i.e., a frequency adjusting terminal, can make the carrier frequency match the maximum or minimum frequency of the transmittance. A driver circuit is used to convert control voltage to current in order to drive the frequency adjusting terminal. Specific means for matching the transmittance of MZI to the carrier frequency is described, for example, in Patent Document 1. In the device described in Patent Document 1, a minute modulation signal (frequency f) is superimposed at optical frequency adjusting terminal through a driver. This minute modulation signal is detected from the output of the optical receiver, and a frequency lock loop is configured that shifts the MZI transmittance with the frequency in such a manner that the output synchronously detected with the minute signal takes zero or a predetermined value. As detection means for the minute modulation signal, a peak detection circuit is used to detect the output amplitude of the optical receiver. As mentioned above, a shift between the carrier frequency and the MZI transmittance causes a reduction in the output amplitude of the optical receiver.

In the meantime, in the method using the peak detection circuit to detect the minute modulation signal, it is indistinguishable as to whether the output port is constructive or destructive upon matching the MZI transmittance and the carrier frequency. Since the MZI transmittance is periodic, if the MZI transmittance is changed on the optical frequency axis, the output port periodically repeats the constructive and destructive states. The repetition cycle of each state is called "FSR (Free Spectral Range). Since the output amplitude of the optical receiver becomes maximum in both states, the output of the synchronous detection circuit becomes zero regardless of whether the MZI output port is set to constructive or destructive as shown in FIG. 30, so that both are indistinguishable. If the output port is wrongly set, since logic "1" or "0" is reversed, normal data reception cannot be performed.

Therefore, in order to distinguish the difference between constructive and destructive of the MZI output port in the device described in Patent Document 1 comprises a second synchronous detection circuit for synchronous detection of an electric signal from an optical receiver circuit, a discrimination circuit for discriminating between positive and negative of the synchronous detection circuit, and an operation point setting circuit for setting an operation point in such a manner that the output of the discrimination circuit is controlled to either of the positive and the negative.

If the phase-modulated signal light is a DQPSK or the like, MZI control becomes further difficult. As means for demodulating the intensity modulation signal from a DQPSK signal in which four phase states (0, p/2, p, 3p/2) exist for each symbol, a structure for placing two MZIs having a 1-symbol delay difference to demodulate a common-mode channel and an orthogonal channel independently is reported as shown, for example, in Non-Patent Document 3 (FIG. 31). In this structure, there is a need to give p/4 and −p/4 phase shifts to short-length optical waveguide (⅛ FSR and −⅛ FSR shifts in terms of frequency). As shown in FIG. 32, the DQPSK deals with four phase states, and four operation points exist for each FSR at which the average amplitude value of the intensity modulation signal after demodulated becomes maximum or the operation point becomes zero. As mentioned above, the DQPSK uses two MZI, and if four operation points exist for each MZI of the common-mode channel and the orthogonal channel, 16 combinations are generated in total. If the demodulated received signal is not subjected to signal processing such as sorting or logic inversion to correct an error in the combinations, one combination of operation points has to be selected from 16 combinations to control the MZI. The MZI of the D8PSK receiver has a structure similar to that in FIG. 31 (Non-Patent Document 4), and the same control is required.

Patent Document 1: Japanese Patent No. 3210061
Non-Patent Document 1: Y. Miyamoto et al., "Novel Modulation and Detection for Bandwidth-Reduction RZ Formats using Duobinary-Mode Splitting in Wideband PSK/ASK Conversion," J. Lightwave Technol., vol. 20, no. 12, pp. 2067-2078, December, 2002.
Non-Patent Document 2: A. Hirano et al., "Performances of CSRZ-DPSK and RZ-DPSK in 43-Gbit/s/ch DWDMG.652 Single-Mode-Fiber Transmission," Tech. Dig. on OFC2003, ThE4, pp. 454-455.
Non-Patent Document 3: R. A. Griffin et al., "Optical differential quadrature phase-shift key (oDQPSK) for high capacity optical," OFC 2002, WX6, 2002.
Non-Patent Document 4: Kamio et al., "Study on Delay Detection Differential 8-PSK," IEICE Technical Report, CS2004-5, p. 23.

DISCLOSURE OF THE INVENTION

Problem to be Solved by the Invention

However, the device described in Patent Document 1 needs two synchronous detection circuits, i.e., a first synchronous detection circuit for synchronous detection of output of the peak detection circuit, and a second synchronous detection circuit for synchronous detection of electric output from the receiver. Further, the control is so complicated that in addition to the control to set the output of the first synchronous detection circuit to be zero or a predetermined value, the output of the second synchronous detection circuit has to be controlled to be positive or negative simultaneously. This is the first problem.

The second problem derives from the difficulty of receiving a multi-value phase-modulated signal such as DPSK, D8PSK, etc. Like the device described in Patent Document 1, if the method judges operation points from whether the output of the second synchronous detection circuit is positive or negative, normal operation points can be judged from two operation points, but a desired operation point cannot be judged from four operation points such as DQPSK.

The third problem relates to frequency pull-in range of the frequency lock loop. In a WDM system, a photocarrier frequency has to be locked at any frequency arranged in a wavelength grid. To this end, a wider pull-in range is required for the frequency lock loop. Further, after it is locked at an any carrier frequency, since the photocarrier frequency of the transmitter or the transmission frequency of MZI can vary by temperature or changes in annual, the frequency lock loop has to maintain the lock even in these changes.

The fourth problem relates to the setting of logic in an RZ-DPSK system. As discussed above, CSRZ modulation is one of RZ pulse modulation method. In this modulation system, an alternating 0/p phase-modulation upon RZ pulse demodulation is superimposed on the phase-modulated optical signal. Therefore, the signal logic inversion occurs during balanced receiving on the receiver side. Thus, there is a need for logic inversion of a signal on the receiving side using RZ pulse demodulating method.

Then, the fifth problem is that frequency adjustment of MZI does not respond linearly to the driving current from a driver. Since the frequency adjustment of MZI is performed by heating of the optical waveguide by means of heater, the frequency shift amount is not a current value and is proportional to the electric power (a product of the current value and the heater resistor value, i.e., square of current) consumed by the heater. Therefore, if current flows more, the frequency shift amount becomes larger, while if current flows less, the frequency shift amount becomes smaller. Thus, the loop gain of the frequency lock loop varies according to the amount of current, and hence the stabilization of the loop and response time can vary.

It is an object of the present invention to provide an optical receiver that can solve at least one of problems among the above-mentioned first to fifth problems.

Means for Solving the Problems

The first aspect of the present invention is an optical receiver for receiving differential coded phase-modulated signal light, the optical receiver comprising: a Mach-Zehnder interferometer for converting the phase-modulated signal light to intensity modulation signal light; a balanced optical receiver for photoelectrically converting the intensity modulation signal light from two output ports of the Mach-Zehnder interferometer to output a difference between converted electric signals; a minute modulation signal generating circuit for minutely modulating the transmittance of the Mach-Zehnder interferometer at a low frequency; a minute modulation signal detecting circuit for detecting a minute modulation signal included in the signal output from the balanced optical receiver; a transmittance detecting circuit for judging, from the signal output from the balanced optical receiver, whether the transmittance of the two output ports of the Mach-Zehnder interferometer is maximum or minimum at a carrier frequency of the phase-modulated signal light; a synchronous detection circuit for synchronously detecting the minute modulation signal included in the signal output from the balanced optical receiver with the signal generated from the minute modulation signal generating circuit; a switch for switching the minute modulation signal detecting circuit and the transmittance detecting circuit to connect it to the synchronous detection circuit; and a control circuit for detecting the signal output from the synchronous detection circuit as a shift amount between the frequency at which the transmittance of the Mach-Zehnder interferometer becomes maximum or minimum, and the carrier frequency to feed back the transmittance of the Mach-Zehnder interferometer to make the shift amount zero or a predetermined value, wherein the switch is set to connect the transmittance detecting circuit to the synchronous detection circuit in an initial stage of frequency pull-in, and if the transmittance detecting circuit detects that the transmittance of the Mach-Zehnder interferometer at the carrier frequency becomes a desired transmittance, the connection of the switch is switched from the transmittance detecting circuit to the minute modulation signal detecting circuit.

The second aspect of the present invention is the optical receiver according to the first aspect of the present invention, wherein the transmittance detecting circuit comprises a lock detecting circuit for detecting, from the output of the synchronous detection circuit, a locked state of the carrier frequency and a frequency at which the transmittance of the Mach-Zehnder interferometer becomes maximum or minimum, and if the lock detecting circuit detects that the frequency at which the transmittance of the Mach-Zehnder interferometer becomes maximum or minimum is locked at the carrier frequency, the connection of the switch is switched from the transmittance detecting circuit to the minute modulation signal detecting circuit.

The third aspect of the present invention is the optical receiver according to the first or second aspect of the present invention, wherein the transmittance detecting circuit comprises a light bandpass filter for band limiting a spectrum of the phase-modulated signal light, and a photocurrent monitoring circuit for monitoring photocurrent flowing into both or either of two light-receiving elements included in the balanced optical receiver.

The fourth aspect of the present invention is the optical receiver according to any one of the first to third aspects of the present invention, further comprising a frequency sweeping circuit for sweeping a pass-band frequency of the Mach-Zehnder interferometer by adding a low-frequency signal to a control signal transmitted from the control circuit to the Mach-Zehnder interferometer, wherein the frequency sweeping circuit performs sweeping until the transmittance of the Mach-Zehnder interferometer at the carrier frequency becomes a desired transmittance, and if the transmittance of the Mach-Zehnder interferometer at the carrier frequency becomes the desired transmittance, the sweeping by the frequency sweeping circuit is stopped.

The fifth aspect of the present invention is the optical receiver according to any one of the first to third aspects of the present invention, further comprising a frequency sweeping circuit for sweeping a pass-band frequency of the Mach-Zehnder interferometer by inputting a low-frequency signal to a reference signal terminal of the control circuit, wherein the frequency sweeping circuit performs sweeping until the transmittance of the Mach-Zehnder interferometer at the carrier frequency becomes a desired transmittance, and if the transmittance of the Mach-Zehnder interferometer at the carrier frequency becomes the desired transmittance, the sweeping by the frequency sweeping circuit is stopped.

The sixth aspect of the present invention is the optical receiver according to the fourth or fifth aspect of the present invention, further comprising a second control circuit for alternately switching the connection of the switch on condition that the pass-band frequency of the Mach-Zehnder interferometer is swept by the frequency sweeping circuit in the initial stage of frequency pull-in to alternately monitor a shift between the frequency, at which the transmittance of the Mach-Zehnder interferometer becomes maximum or minimum, and the carrier frequency, and a signal of the synchronous detection circuit upon connecting the minute modulation signal detecting circuit, and the frequency at which no shift occurs is used as a starting point to count the number of times the signal of the synchronous detection circuit becomes zero or a predetermined value, and if it reaches predetermined times, the frequency sweeping circuit stops sweeping and the connection of the switch is fixed to the minute modulation signal detecting circuit.

The seventh aspect of the present invention is the optical receiver according to the fourth or fifth aspect of the present invention, further comprising a second control circuit for connecting the connection of the switch to a photocurrent monitoring circuit included in the transmittance detecting circuit on condition that the pass-band frequency of the Mach-Zehnder interferometer is swept by the frequency sweeping circuit in the initial stage of frequency pull-in, to monitor a sift between the frequency at which the transmittance of the Mach-Zehnder interferometer becomes maximum or minimum and the carrier frequency, and if no shift is detected in the frequency, the connection of the switch is switched to the minute modulation signal detecting circuit to count the number of times the signal of the synchronous detection circuit becomes zero or a predetermined value on condition that sweeping is continued, and if it becomes predetermined times, the sweeping by the frequency sweeping circuit is stopped.

The eighth aspect of the present invention is the optical receiver according to any one of the fourth to seventh aspects of the present invention, further comprising an operation point judging circuit for judging whether a signal value of the control signal transmitted from the control circuit to the Mach-Zehnder interferometer exceeds a predetermined upper or lower value, wherein after completion of pull-in of the pass-band frequency of the Mach-Zehnder interferometer by the control circuit, if it is detected that the signal value exceeds the upper value or the lower value by means of the operation point judging circuit, the pull-in of the control circuit is restarted.

The ninth aspect of the present invention is the optical receiver according to any one of the fourth to eighth aspects of the present invention, further comprising a breaking circuit for blocking input of a signal from the synchronous detection circuit to the control circuit, wherein the input of the signal from the synchronous detection circuit to the control circuit is blocked until transmittance of the Mach-Zehnder interferometer at the carrier frequency becomes a desired transmittance, and if the transmittance of the Mach-Zehnder interferometer at the carrier frequency becomes the desired transmittance, the input of the signal from the synchronous detection circuit to the control circuit is released from blocking.

The tenth aspect of the present invention is the optical receiver according to any one of the fourth to ninth aspects of the present invention, wherein the pull-in range when the frequency sweeping circuit sweeps the pass-band frequency of the Mach-Zehnder interferometer is set wider than the modulation frequency of the phase-modulated signal light, and the lock range that the control circuit is able to lock the transmittance of the Mach-Zehnder interferometer is set wider than the pull-in range.

The eleventh aspect of the present invention is the optical receiver according to any one of the first to tenth aspects of the present invention, wherein the transmittance detecting circuit performs logic inversion in accordance with an external command.

The twelfth aspect of the present invention is the optical receiver according to any one of the first to eleventh aspects of the present invention, further comprising a frequency adjusting terminal provided in the Mach-Zehnder interferometer to change the transmittance of the Mach-Zehnder interferometer according to an input current value, a square-root circuit for extracting the square root of the signal value of the control signal transmitted from the control circuit to the Mach-Zehnder interferometer, and a driver circuit for converting a driving current of the computed value of the square-root circuit to a driving current to input it to the frequency adjusting terminal.

The thirteenth aspect of the present invention is the optical receiver according to any one of the first to eleventh aspects of the present invention, further comprising a first frequency adjusting terminal provided in the first optical waveguide of the Mach-Zehnder interferometer to change the transmittance of the Mach-Zehnder interferometer according to an input current value, a second frequency adjusting terminal provided in the second optical waveguide of the Mach-Zehnder interferometer to change the transmittance of the Mach-Zehnder interferometer according to an input current value, a differential circuit for converting, to a differential signal, the control signal transmitted from the control circuit to the Mach-Zehnder interferometer, a first driver circuit for converting a first differential signal obtained from the differential circuit to a driving current to input it to the first frequency adjusting terminal, and a second driver circuit for converting a second differential signal obtained from the differential circuit to input it to the second frequency adjusting terminal.

Effects of the Invention

According to the present invention, the transmittance of the Mach-Zehnder interferometer can be locked by the transmittance detecting circuit using only normal operation points. Further, after locked, the switch is switched to the minute modulation signal detecting circuit so that the frequency at which the transmittance of the Mach-Zehnder interferometer becomes maximum or minimum can exactly be matched with the carrier frequency. Further, the structure of the optical receiver of the present invention adds the transmittance detecting circuit and the switch to the conventional optical receiver, so that almost all the parts including the synchronous detection circuit can be used as they area, resulting in very simplicity of the circuit structure. Further, even if either the transmittance detecting circuit or the minute modulation signal detecting circuit is connected to the synchronous detection circuit, since it is common that the transmittance of the Mach-Zehnder interferometer is fed back so that the signal output from the synchronous detection circuit becomes zero or a desired value, control can also be simplified.

Further, according to the present invention, a frequency at which no shift occurs between the frequency at which the transmittance of the Mach-Zehnder interferometer becomes maximum or minimum and the carrier frequency is used as a starting point by means of the second control circuit. Then, the number of times the signal output from the synchronous detection circuit becomes zero or a desired value is counted, and if it reaches predetermined times, the connection of the switch is fixed to the minute modulation signal detecting circuit. Thus, desired operation points can be judged from the multi-value phase-modulated signal such as DQPSK.

Further, according to the present invention, a low-frequency signal for sweeping a passband frequency of the Mach-Zehnder interferometer is added to a control signal transmitted from the control circuit to the Mach-Zehnder interferometer, or input to a reference signal terminal of the control circuit, so that the pull-in range can be enormously widened.

Further, according to the present invention, since the transmittance detecting circuit is subjected to logic inversion in accordance with an external command, the transmittances of the two output ports of the Mach-Zehnder interferometer can be arbitrarily set in either constructive or destructive state for the carrier frequency.

Further, according to the present invention, the frequency adjusting terminal of the Mach-Zehnder interferometer is current driven by an square-root value of the control signal or a differential signal differentially converting the control signal, so that the frequency changing characteristic of the Mach-Zehnder interferometer can linearly respond to the control signal. This makes it possible to maintain the loop gain of the frequency lock loop without depending on the operation points of the Mach-Zehnder interferometer.

BEST MODES FOR CARRYING OUT THE INVENTION

Embodiment 1

Figure 1:
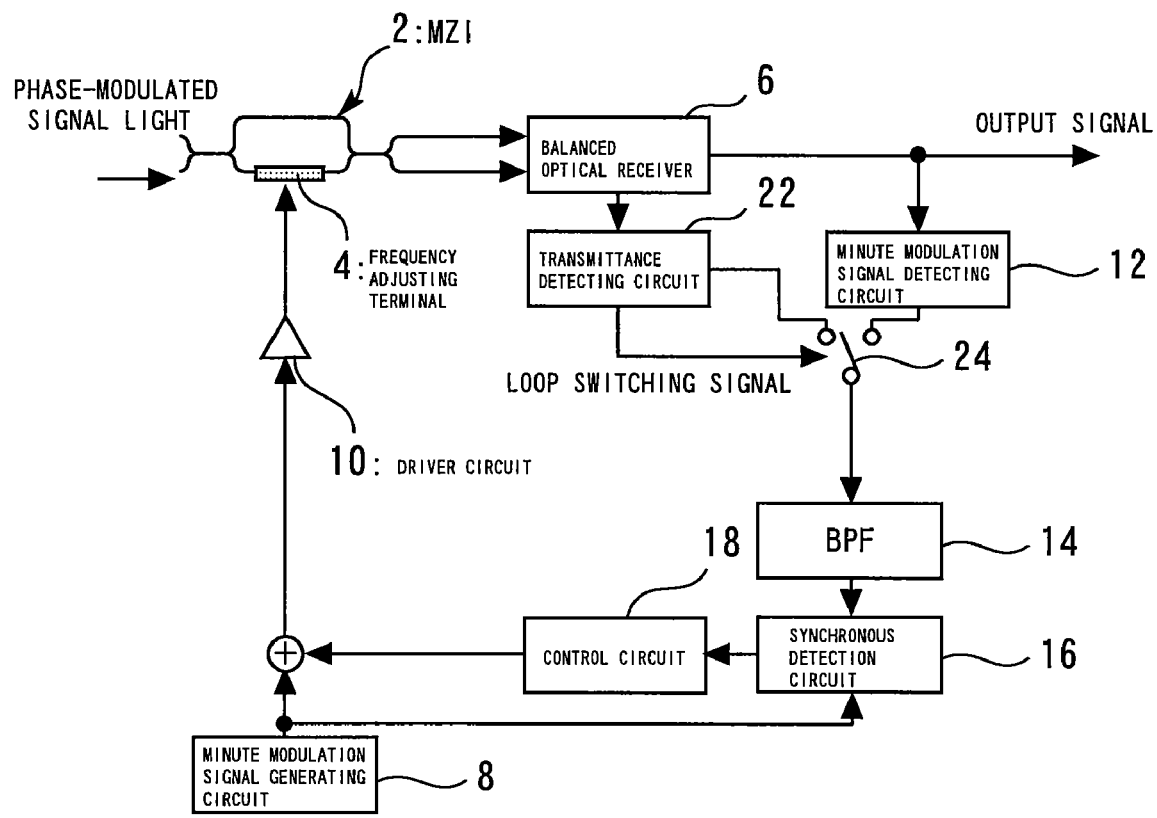
FIG. 1 is a block diagram showing the structure of an optical receiver according to Embodiment 1 of the present invention.

FIG. 1 is a block diagram showing the structure of an optical receiver according to Embodiment 1 of the present invention. The optical receiver of the embodiment is an optical receiver applied to a DPSK type optical communication system. As shown in FIG. 1, an MZI (Mach-Zehnder interferometer) 2 is provided to demodulate differential coded phase-modulated signal light to an intensity modulation signal. The MZI 2 divides the phase-modulated signal light into two, and after a one-bit propagation delay is given to the divided one, both are combined to interfere with each other in order to convert it to an intensity modulation signal light.

Among two optical waveguides included in the MZI 2, one optical waveguide is provided with a frequency adjusting terminal 4. The frequency adjusting terminal 4 is a heater for heating the optical waveguide by receiving the supply of the driving current from a driver circuit 10. Depending on the amount of current supplied from the driver circuit 10 to the frequency adjusting terminal 4, an optical phase difference between both phase-modulated signal light to interfere with each other can be adjusted. The optical receiver of the embodiment has a minute modulation signal generating circuit 8 for generating a minute modulation signal (frequency f). The driver circuit 10 converts the minute modulation signal generated by the minute modulation signal generating circuit 8 into a driving current to current-drive the frequency adjusting terminal 4.

Output light from each of the output ports of the MZI 2 is received by a balanced optical receiver 6. A minute modulation signal detecting circuit 12 is connected to the balanced optical receiver 6. The minute modulation signal included in the output of the balanced optical receiver 6 is detected by the minute modulation signal detecting circuit 12. The output of the minute modulation signal detecting circuit 12 is synchronously detected using a signal generated from the minute modulation signal generating circuit 8 by means of a band-pass filter (BPF) 14 and a synchronous detection circuit 16.

The output of the synchronous detection circuit 16 is input to a control circuit 18. The control circuit 18 detects the output of the synchronous detection circuit 16 as an error signal, and feeds it back to the frequency adjusting terminal 4 of the MZI 2 in a direction to neutralize the error signal. A signal output from the control circuit 18 is added to a signal generated by the minute modulation signal generating circuit 8 and input to the driver circuit 10.

Further, the optical receiver of the embodiment is provided with a transmittance detecting circuit 22 for judging, from the output of the balanced optical receiver 6, whether the two output ports of MZI 2 are constructive or destructive. The transmittance detecting circuit 22 includes a circuit for detecting one or both of output signals from two light-receiving elements included in the balanced optical receiver 6. In the embodiment, the optical receiver is configured such that among the two output ports of the MZI 2, the output signal of one light-receiving element corresponding to output 2 is detected.

The optical receiver of the embodiment is provided with a switch 24 for switching between the output of the transmittance detecting circuit 22 and the output of the minute modulation signal detecting circuit 12 to connect it to the synchronous detection circuit 16. This switch 24 is switched by a loop switching signal from the transmittance detecting circuit 22. When the switch 24 is switched to the side of the minute modulation signal detecting circuit 12, a frequency lock loop is configured of the MZI 2, the minute modulation signal generating circuit 8, the driver circuit 10, the balanced optical receiver 6, the minute modulation signal detecting circuit 12, the BPF 14, the synchronous detection circuit 16, and the control circuit 18. When the switch 24 is switched to the side of the transmittance detecting circuit 22, a frequency lock loop is configured of the MZI 2, the minute modulation signal generating circuit 8, the driver circuit 10, the balanced optical receiver 6, the transmittance detecting circuit 22, the BPF 14, the synchronous detection circuit 16, and the control circuit 18.

First, in an initial stage of frequency pull-in, the switch 24 is switched to the side of the transmittance detecting circuit 22, and a frequency lock loop is so configured that the transmittance detecting circuit 22 is connected to the synchronous detection circuit 16. In this frequency lock loop, the output of the transmittance detecting circuit 22 is synchronously detected using the minute modulation signal of frequency f generated by the minute modulation signal generating circuit 8. The result of synchronous detection is sent back to the transmittance detecting circuit 22. The transmittance detecting circuit 22 judges, from the synchronous detection result, whether the two output ports of the MZI 2 are constructive or destructive.

Figure 2:
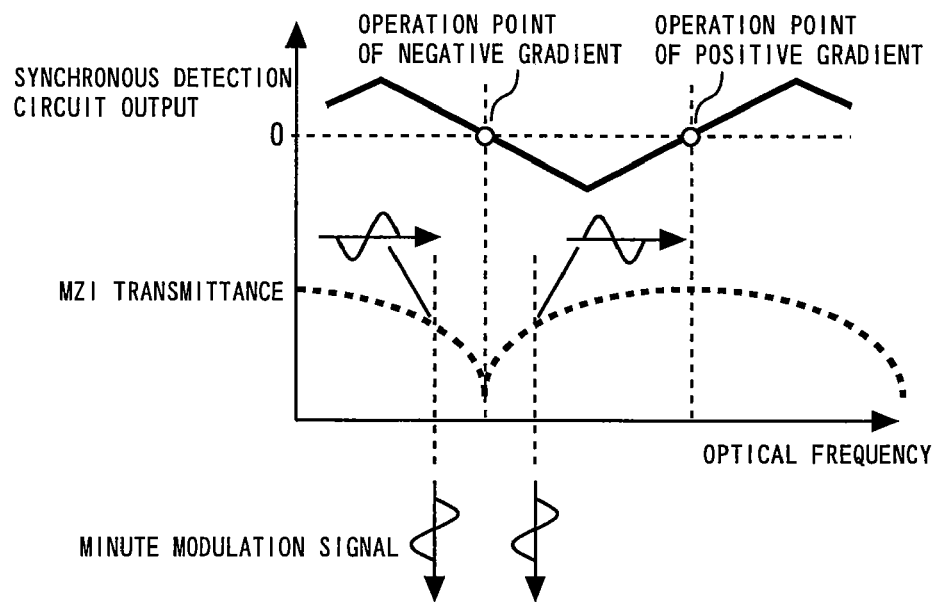
FIG. 2 is a diagram for explaining the judgment of MZI transmittance with a transmittance detecting circuit.

FIG. 2 shows a synchronous detection circuit output obtained by synchronous detection of a frequency f component included in the output of the transmittance detecting circuit 22 in contrast with a transmittance (MZI transmittance) corresponding to output 2 in the two output ports of the MZI 2. As shown in FIG. 2, the synchronous detection circuit output becomes zero both when the carrier frequency matches the frequency of the MZI transmittance at which the MZI transmittance is maximum, and when the carrier frequency matches the frequency of the MZI transmittance at which the MZI transmittance is minimum. Note that the gradient of the synchronous detection circuit output is positive at the maximum point of the MZI transmittance and the gradient of the synchronous detection circuit output is negative at the minimum point of the MZI transmittance. Therefore, whether the transmittance of each of the output ports of the MZI 2 is constructive or destructive can be judged according to the positive or negative gradient of the synchronous detection output.

Further, as discussed above, the maximum point and the minimum point of the MZI transmittances match the carrier frequency at a frequency at which the synchronous detection circuit output becomes zero. Therefore, if the frequency lock loop is configured using the transmittance detecting circuit 22 and the loop is so set that negative feedback is provided in either of states in which the gradient of the synchronous detection circuit output is negative or positive, the MZI transmittance can be locked to the carrier frequency in either of states, constructive or destructive. The transmittance detecting circuit 22 also includes a circuit for detecting whether the MZI transmittance is locked to the carrier frequency in a desired state. In the embodiment, among two output ports of MZI 2, the desired state is constructive for output 1 and destructive for output 2, respectively.

If the loop is locked in the above loop structure, a loop switching signal is output from the transmittance detecting circuit 22 to the switch 24. The loop switching signal switches the switch 24 from the transmittance detecting circuit 22 to the minute modulation signal detecting circuit 12 to provide a frequency lock loop using the minute modulation signal detecting circuit 12.

Figure 3:
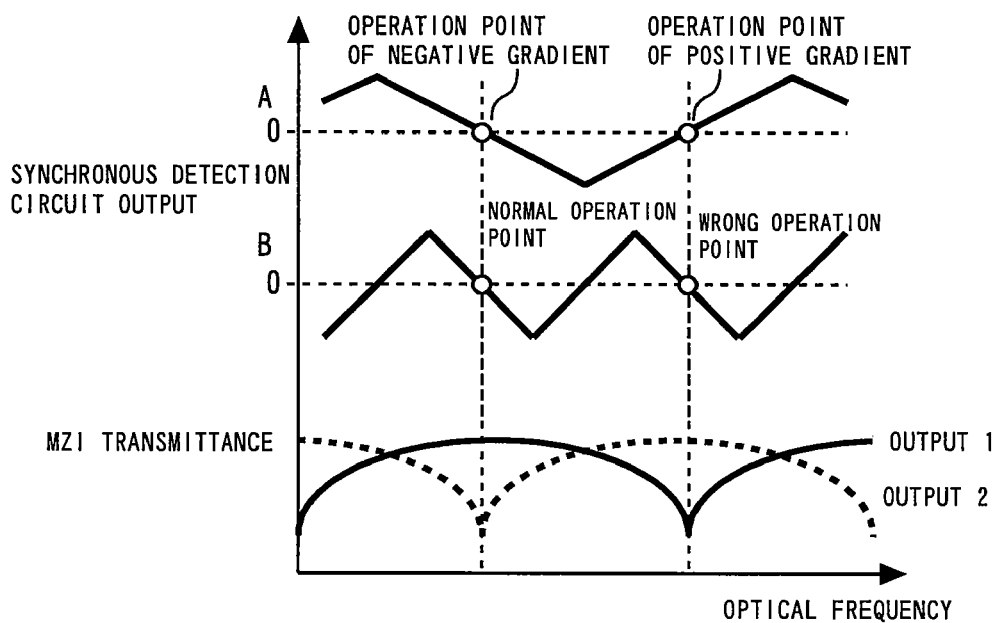
FIG. 3 shows a relationship between a synchronous detection circuit output and MZI transmittance.

FIG. 3 shows a synchronous detection circuit output (A) obtained by synchronous detection of a frequency f component included in the output of the transmittance detecting circuit 22, and a synchronous detection circuit output (B) obtained by synchronous detection of frequency f component included in the output of the minute modulation signal detecting circuit 12 in contrast with the transmittance (MZI transmittance) of each of the output ports (output 1 and output 2) of the MZI 2. As shown in FIG. 3, the synchronous detection circuit output (B) using the minute modulation signal detecting circuit 12 has double the frequency of the synchronous detection circuit output (A) using the transmittance detecting circuit 22. Therefore, according to this frequency lock loop, a difference between the MZI frequency (at which MZI transmittance is maximum or minimum) and the carrier frequency can be detected for higher sensitivity to match the MZI frequency with the carrier frequency.

As described above, according to the optical receiver of the embodiment, the transmittance detecting circuit 22 can lock the transmittance of the MZI 2 only at a normal operation point, and after locked, the switch 24 is switched to the minute modulation signal detecting circuit 12 to exactly match the MZI frequency with the carrier frequency. Further, the optical receiver of the embodiment can be configured only by adding the transmittance detecting circuit 22 and the switch 24 to the conventional optical receiver, and almost all the parts of the frequency lock loop including the synchronous detection circuit 16 can be used as they are, resulting in very simplicity of the circuit structure. Further, even if either the transmittance detecting circuit 22 or the minute modulation signal detecting circuit 12 is connected to the synchronous detection circuit 16, since it is common that the MZI frequency is so changed that the synchronous detection circuit output becomes zero, control is also simplified.

Embodiment 2

Figure 4:
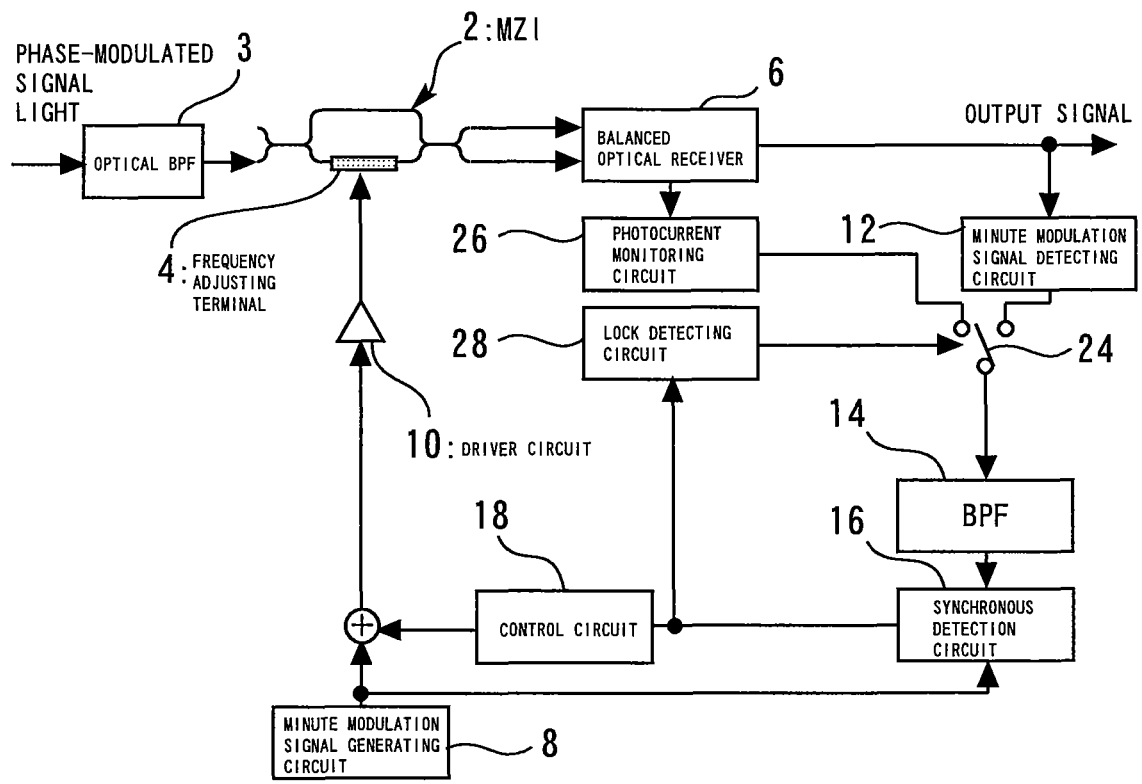
FIG. 4 is a block diagram showing the structure of an optical receiver according to Embodiment 2 of the present invention.

FIG. 4 is a block diagram showing the structure of an optical receiver according to Embodiment 2 of the present invention. In the optical receiver shown in FIG. 4, the same components as those in the optical receiver of Embodiment 1 are given the same reference numerals. Further, the description of the content already described is omitted.

Figure 28:
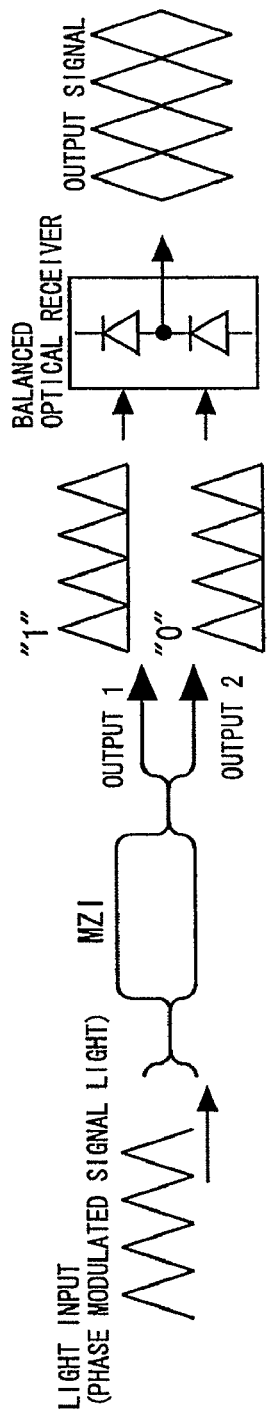
FIG. 28 is a diagram for explaining the structure and the operation of a DPSK type optical receiver.
Figure 28:
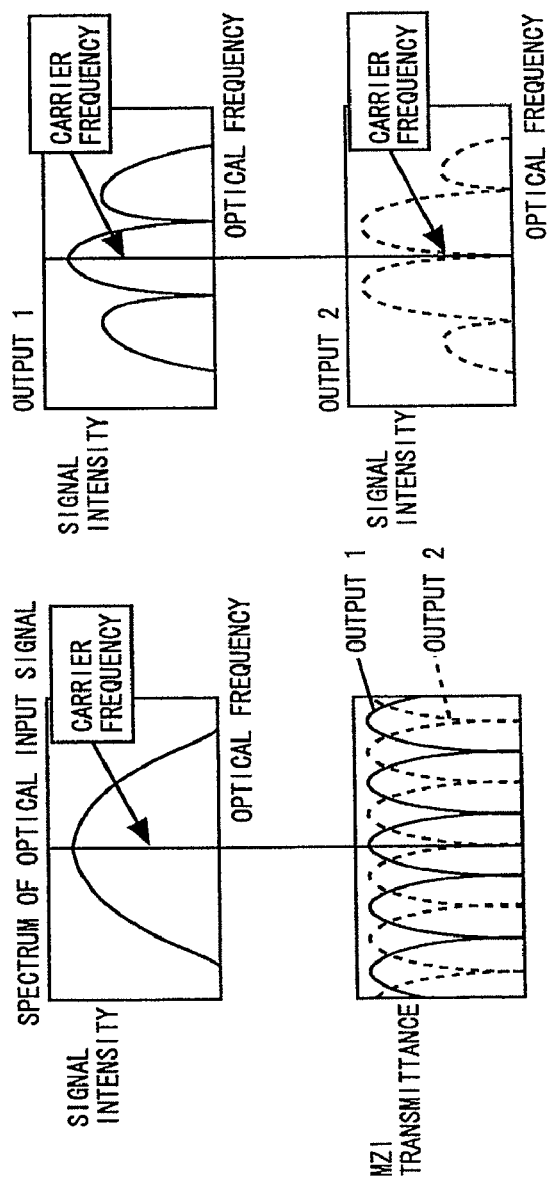
Figure 29:
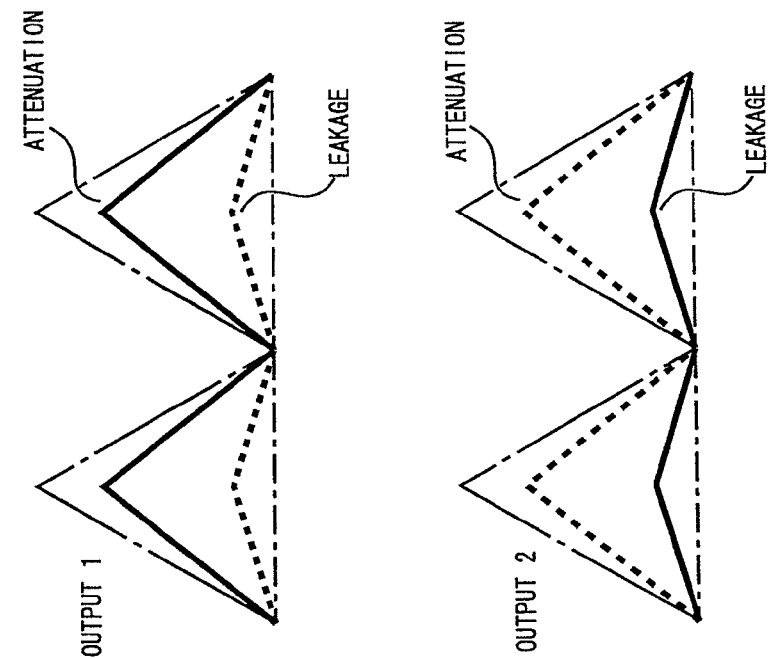
FIG. 29 is a diagram for explaining the wave deterioration caused by a shift between the carrier frequency and the MZI transmittance.
Figure 29:
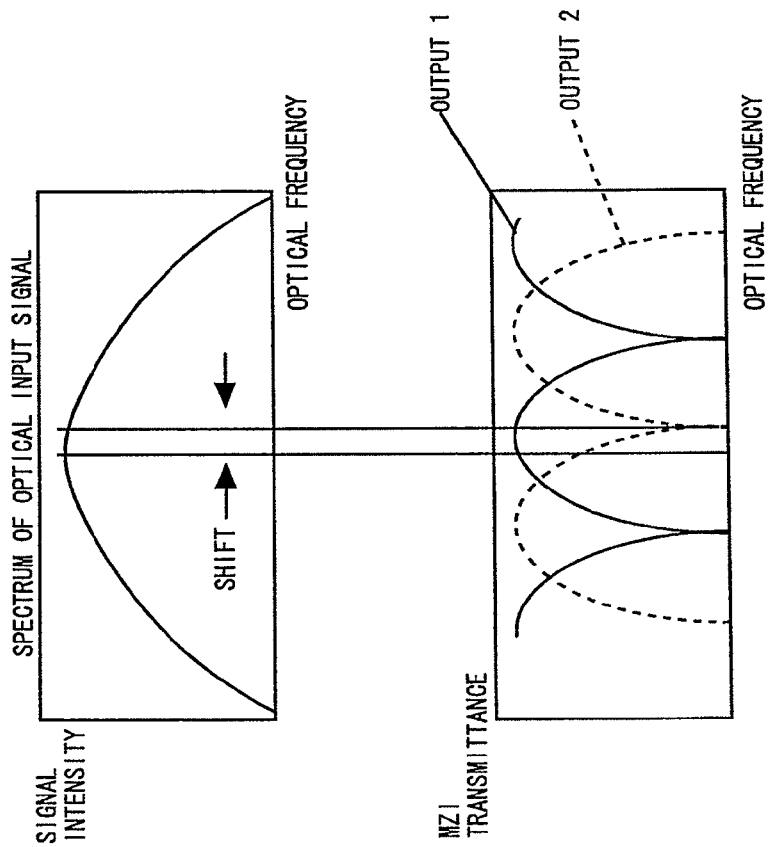
Figure 30:
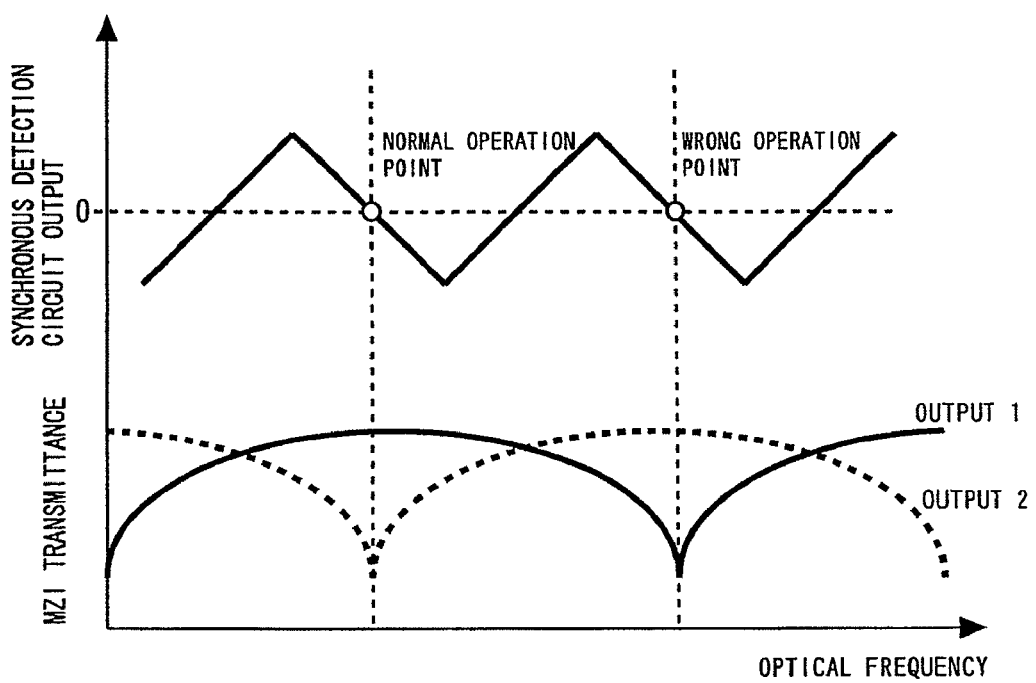
FIG. 30 is a diagram for explaining the problem of a prior art.
Figure 31:
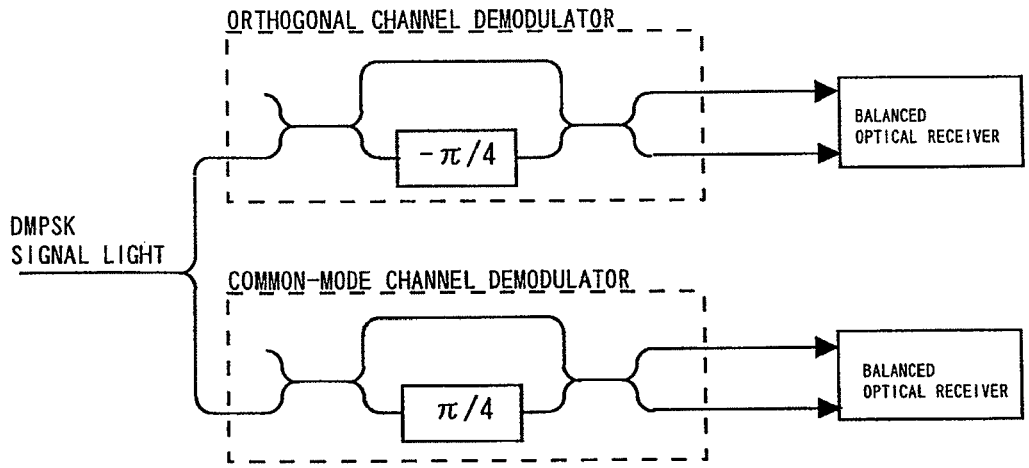
FIG. 31 is a diagram for explaining the structure of a DQPSK type optical receiver.
Figure 32:
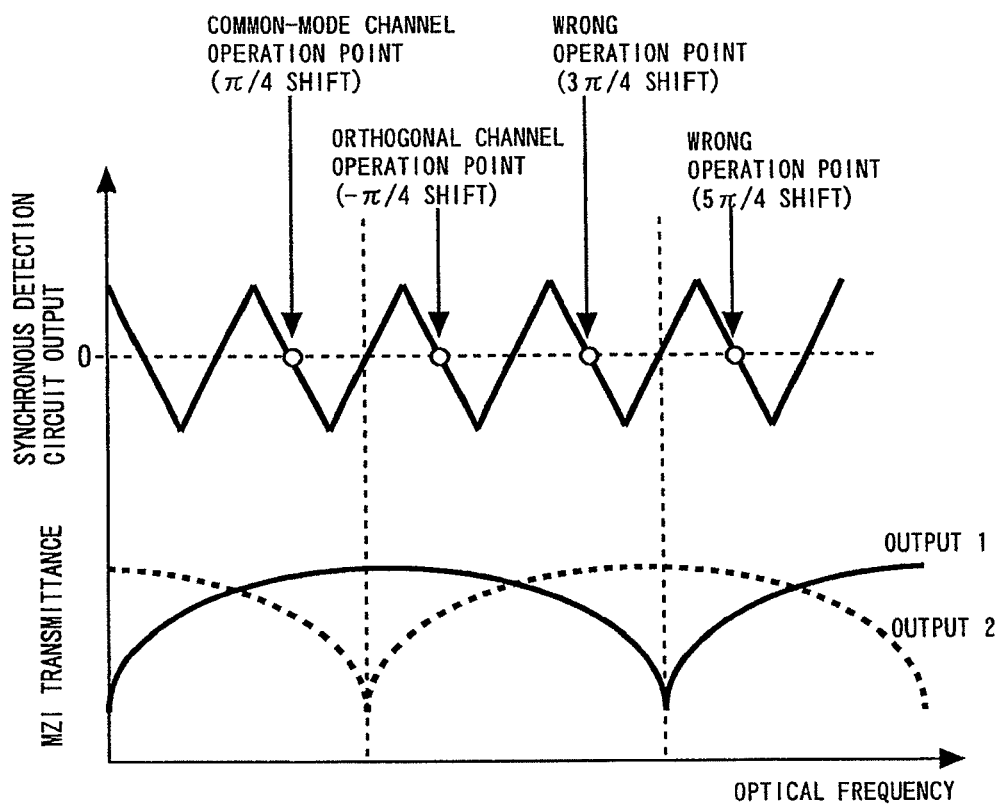
FIG. 32 is a diagram for explaining the problem of a prior art.

As shown in FIG. 4, the optical receiver of the embodiment is provided with an optical BPF (bandpass filter) 3 and a photocurrent monitoring circuit 26. If the spectrum of a light input signal is sufficiently wide for FSR of a demodulator, the light intensity after passing through the MZI 2 is difficult to vary for the optical frequency. Therefore, the optical BPF 3 band limits the spectrum in such a manner to attenuate areas away from the carrier frequency among the spectra of the outputs 1 and 2 after passing through the MZI 2 as shown in FIG. 28(c). It is apparent from the drawing that, since the output 1 (constructive side) and the output 2 (destructive side) differ in the intensity distribution on the optical frequency axis, the influence of intensity attenuation in the vicinity of the optical BPF 3 is large on the constructive side. Therefore, in case of DPSK signal, if the MZI transmittance matches the carrier frequency, the optical intensity after passing through the MZI 2 becomes minimum on the constructive side and maximum on the destructive side. Thus, from a change in optical intensity in each of the output ports of the MZI 2, the relationship between the MZI transmittance and the carrier frequency can be detected.

Figure 5:
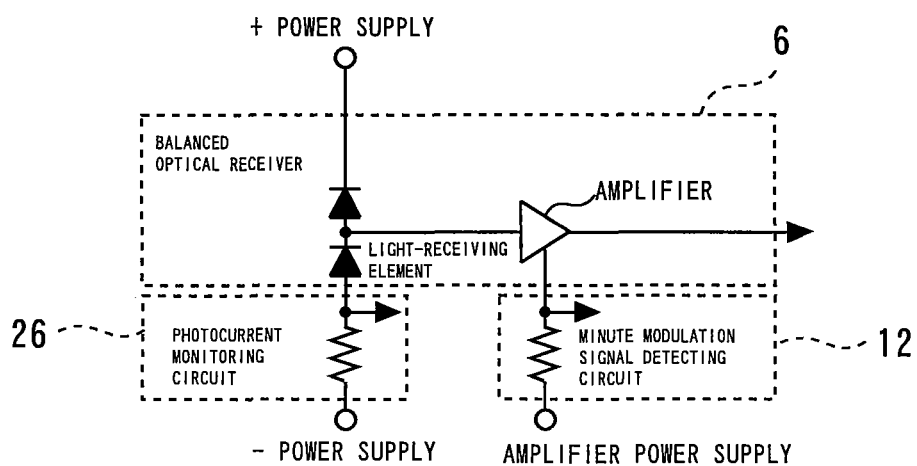
FIG. 5 shows a structure of a photocurrent monitoring circuit and a minute modulation signal detecting circuit.

The photocurrent monitoring circuit 26 detects a change in optical intensity as a change in photocurrent flowing into a power supply terminal of a light-receiving element of the balanced optical receiver 6. FIG. 5 shows a specific structure of the photocurrent monitoring circuit 26 and the minute modulation signal detecting circuit 12. As shown in FIG. 5, the photocurrent monitoring circuit 26 can easily be implemented by inserting a resistor between the one light-receiving element of the balanced optical receiver 6 and its power supply. Alternatively, resistors can be inserted between both the light-receiving elements and their power supplies so that a difference between outputs can be taken from each resistor. Further, the minute modulation signal detecting circuit 12 can be implemented by inserting a resistor between an amplifier and its power supply constituting the balanced optical receiver 6. According to the optical receiver of the embodiment, detection equivalent in degree of precision to power detection can be provided without the need for power detection of the amplitude of a high-speed photoelectrically converted electric signal.

Further, the optical receiver of the embodiment has a lock detecting circuit 28 for detecting that the loop is locked when the frequency lock loop is configured by the photocurrent monitoring circuit 26 by means of the switch 24. When detecting that the loop is locked, the lock detecting circuit 28 switches the connection of the switch 24 from the photocurrent monitoring circuit 26 to the minute modulation signal detecting circuit 12. This can detect a difference between the MZI transmittance and the carrier frequency with a high degree of sensitivity to exactly lock it. In the embodiment, the photocurrent monitoring circuit 26 and the lock detecting circuit 28 configures a circuit corresponding to the transmittance detecting circuit 22 according to Embodiment 1.

Embodiment 3

Figure 6:
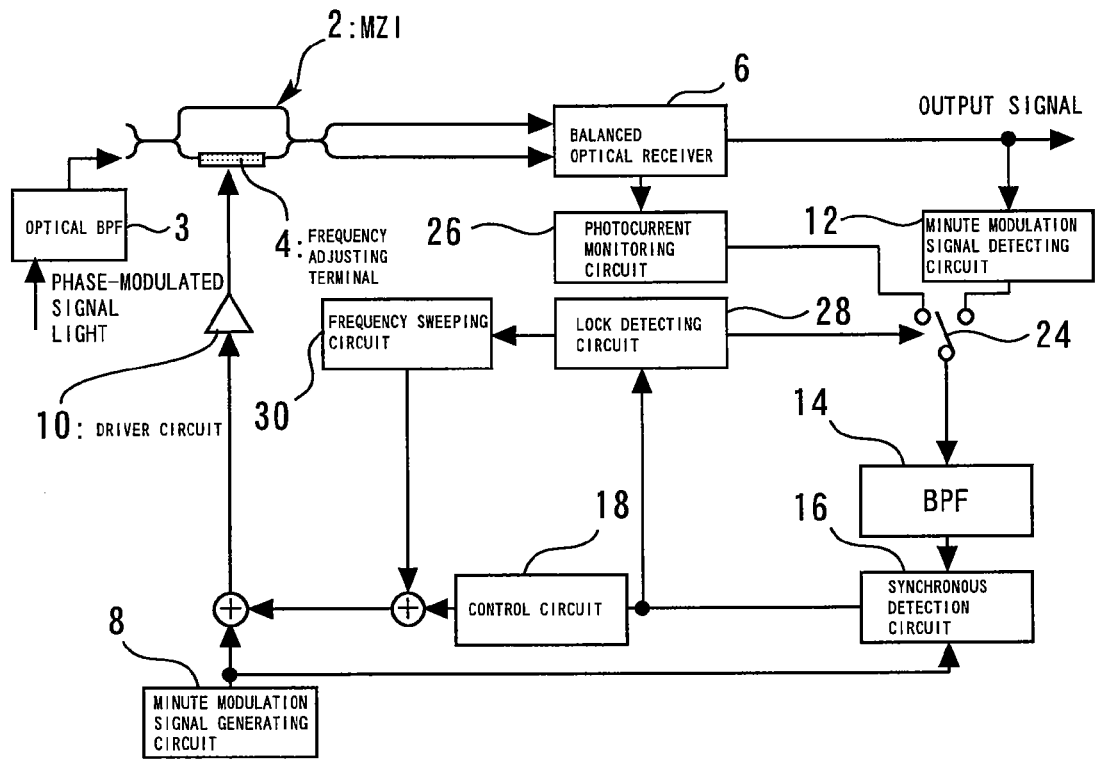
FIG. 6 is a block diagram showing the structure of an optical receiver according to Embodiment 3 of the present invention.

FIG. 6 is a block diagram showing the structure of an optical receiver according to Embodiment 3 of the present invention. In the optical receiver shown in FIG. 6, the same components as those of the optical receiver of either of the above mentioned embodiments are given the same numerals. Further, the description of the content already described is omitted.

A different point in structure of the optical receiver of the embodiment from that of Embodiment 2 is that a frequency sweeping circuit 30 is so provided that the output (low-frequency signal) of the frequency sweeping circuit 30 is added to a voltage path of the frequency lock loop. The output of the frequency sweeping circuit 30 can be any signal, such as pyramidal wave, sawtooth wave, or sine wave, as long as the frequency is delayed than the response speed of the MZI 2 and the signal speed of the minute modulation.

Figure 7:
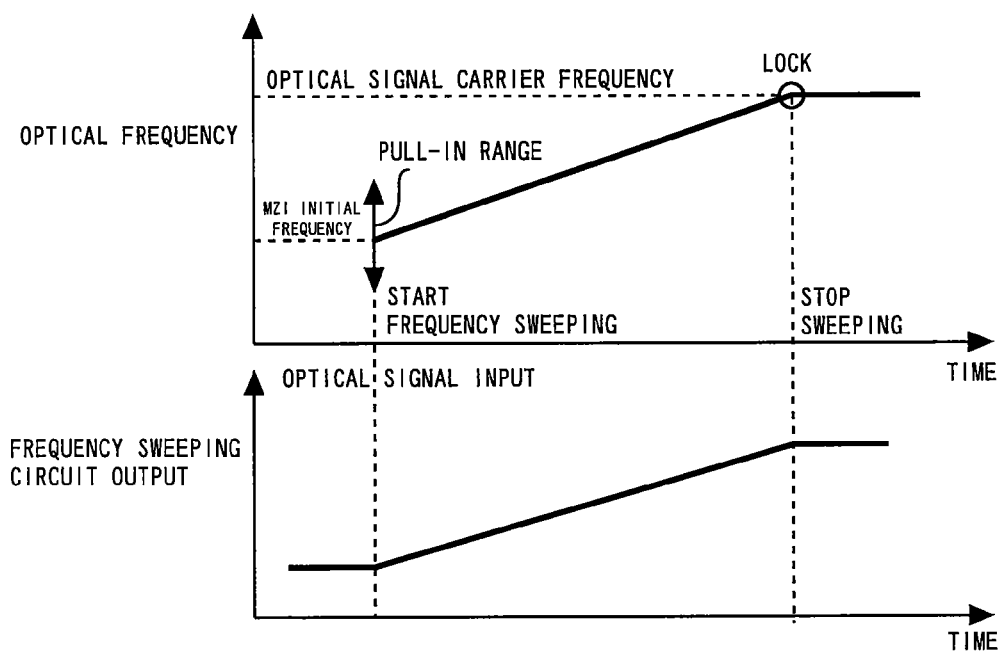
FIG. 7 is a diagram for explaining the principle of the pull-in range expansion by a frequency sweeping circuit.

In the optical receiver of the embodiment, in an initial stage of frequency pull-in, i.e., when the frequency lock loop is not locked, the switch 24 connects the photocurrent monitoring circuit 26 to the synchronous detection circuit 16, and the frequency sweeping circuit 30 enormously changes the MZI frequency. Thus, as shown in operation principle diagram of FIG. 7, even if it cannot be locked only by frequency lock loop because the carrier frequency is located away from the pull-in range, since a state in which it becomes close to the carrier frequency in a process of changing the MZI frequency, pull-in is made possible. When the lock detecting circuit 28 detects the locked state, the frequency sweeping circuit 30 holds the instantaneous value.

Embodiment 4

Figure 8:
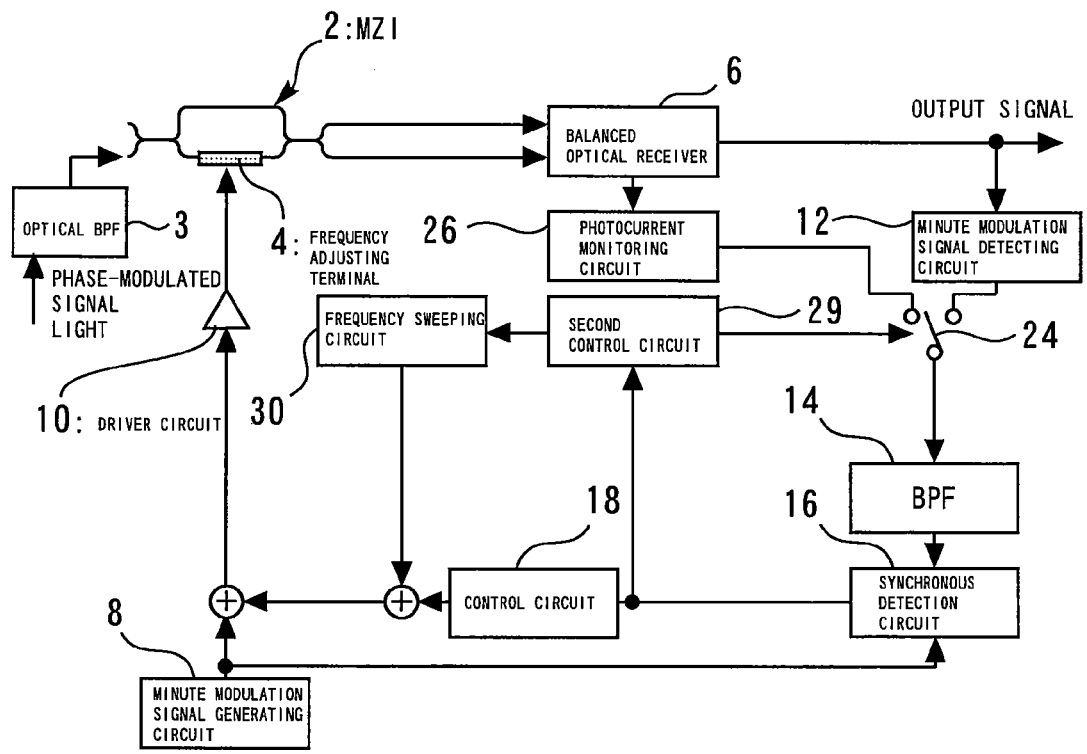
FIG. 8 is a block diagram showing the structure of an optical receiver according to Embodiment 4 of the present invention.

FIG. 8 is a block diagram showing the structure of an optical receiver according to Embodiment 4 of the present invention. In the optical receiver shown in FIG. 8, the same components as those of the optical receiver of any one of the above-mentioned embodiments are given the same reference numerals. Further, the description of the content already described is omitted.

A different point in structure between the optical receiver of the embodiment and Embodiment 3 is that the connection of the switch 24 is alternatively switched between the photocurrent monitoring circuit 26 and the minute modulation signal detecting circuit 12 by means of a second control circuit 29, rather than detecting the lock in such a state that the connection of the switch 24 is fixed to the photocurrent monitoring circuit 26 in the frequency sweeping state of the MZI 2 in the initial stage of the frequency synchronization.

Figure 9:
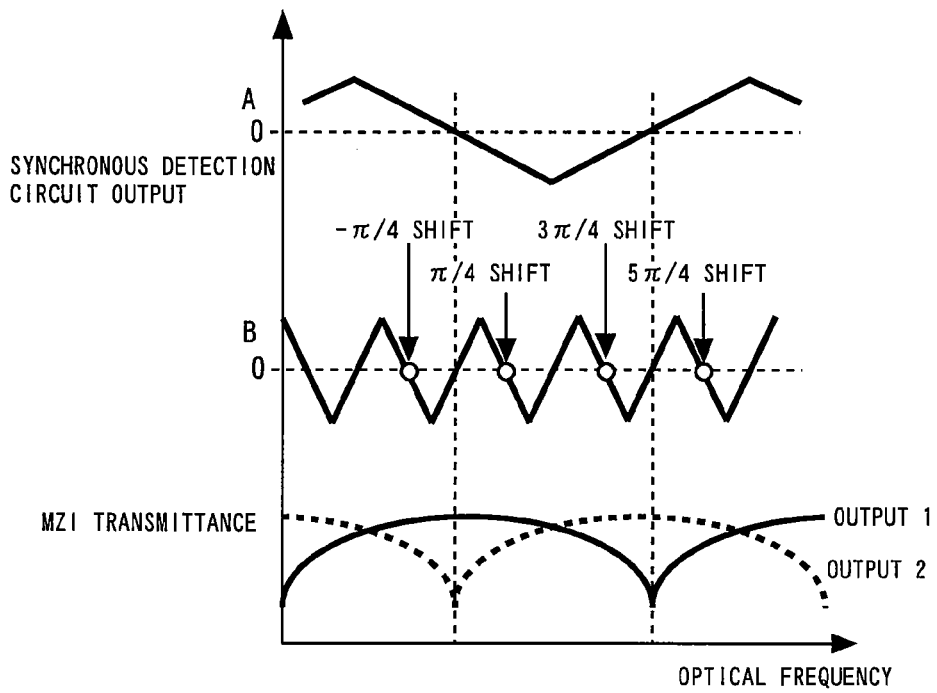
FIG. 9 shows relation with a synchronous detection circuit output and MZI transmittance according to Embodiment 4 of the present invention.

If the phase-modulated signal light is DQPSK signal, the synchronous detection output (A) of the photocurrent monitoring circuit 26 and the synchronous detection circuit output (B) of the minute modulation signal detecting circuit 12 vary with the pass-band characteristic of the MZI 2 as shown in FIG. 9. If the frequency at which the MZI transmittance becomes maximum or minimum matches the carrier frequency (operation point of DPSK), the photocurrent synchronous detection output (A) becomes zero having a positive or negative gradient. As described above, in case of DQPSK, there are four operation points, i.e., points at which the minute modulation signal synchronous detection output (B) is zero. Among them, the desired operation points are a zero point (phase-shift amount -p/4) and the following zero point (phase-shift amount p/4) that pass through zero point of the photocurrent synchronous detection output (A) with the negative gradient for the optical frequency.

Figure 10:
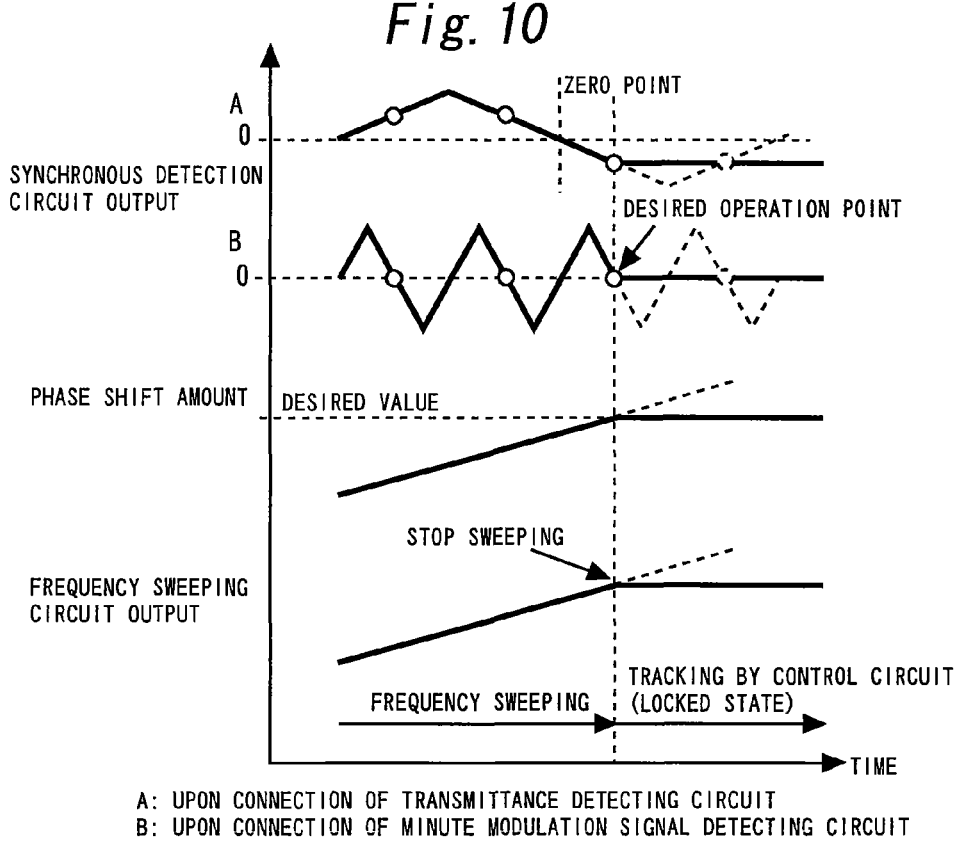
FIG. 10 shows an operation principle of an optical receiver according to Embodiment 4 of the present invention.

In the embodiment, while sweeping the frequency of the MZI 2 by means of the frequency sweeping circuit 30, the second control circuit 29 monitors alternately the two synchronous detection outputs (A) and (B) to detect a desired operation point. The operation principle is shown in FIG. 10. In this figure, the MZI frequency is swept to high-frequency side over the time. Therefore, as time passes or when the photocurrent synchronous detection output (A) is reduced to zero with an increase in frequency, the point at which it becomes zero is used as a starting point. Then, the previous or following point at which the minute modulation signal synchronous detection output (B) becomes zero is selected to stop frequency sweeping of the MZI 2. Then, if the connection of the switch 24 is fixed to the minute modulation signal detecting circuit 12, synchronization can be provided at -p/4 or p/4 phase shift amount. Further, the MZI 2 stops frequency sweeping after the minute modulation signal synchronous detection output becomes zero predetermined times from the starting point to switch the switch 24 in order to lock a desired operation point.

Further, the D8PSK signal can be locked in the same manner at a desired operation point.

Embodiment 5

Figure 11:
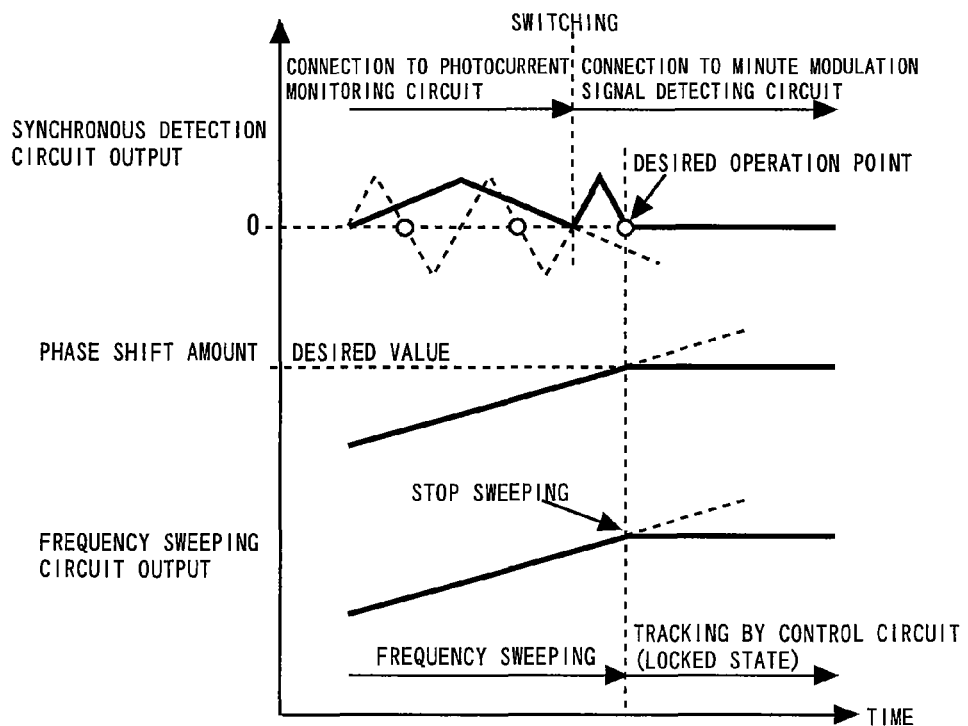
FIG. 11 shows an operation principle of an optical receiver according to Embodiment 5 of the present invention.

FIG. 11 shows an operation principle of an optical receiver according to Embodiment 5 of the present invention. Although the receiver of the embodiment has the same structure as in FIG. 8, a different point between the optical receiver of the embodiment and that of Embodiment 4 is that the DQPSK signal is locked without alternately switching the connection of the switch 24.

First, in an initial stage of frequency pull-in, the switch 24 is connected to the photocurrent monitoring circuit 26 to provide frequency sweeping of the MZI 2. Under this condition, the synchronous detection circuit output is monitored, and at the time when the output is reduced with time and reaches zero, the connection of the switch 24 is switched to the minute modulation signal detecting circuit 12. Then, the frequency sweeping is continued and, at the time when the minute modulation signal synchronous detection output becomes zero predetermined times (once in the embodiment), the MZI 2 stops frequency sweeping so that it can be locked at desired operation point. Further, from the instant of switching the switch 24, the MZI frequency sweeping direction is reversed to enable locking by returning to the previous operation point before the switching point.

Embodiment 6

Figure 12:
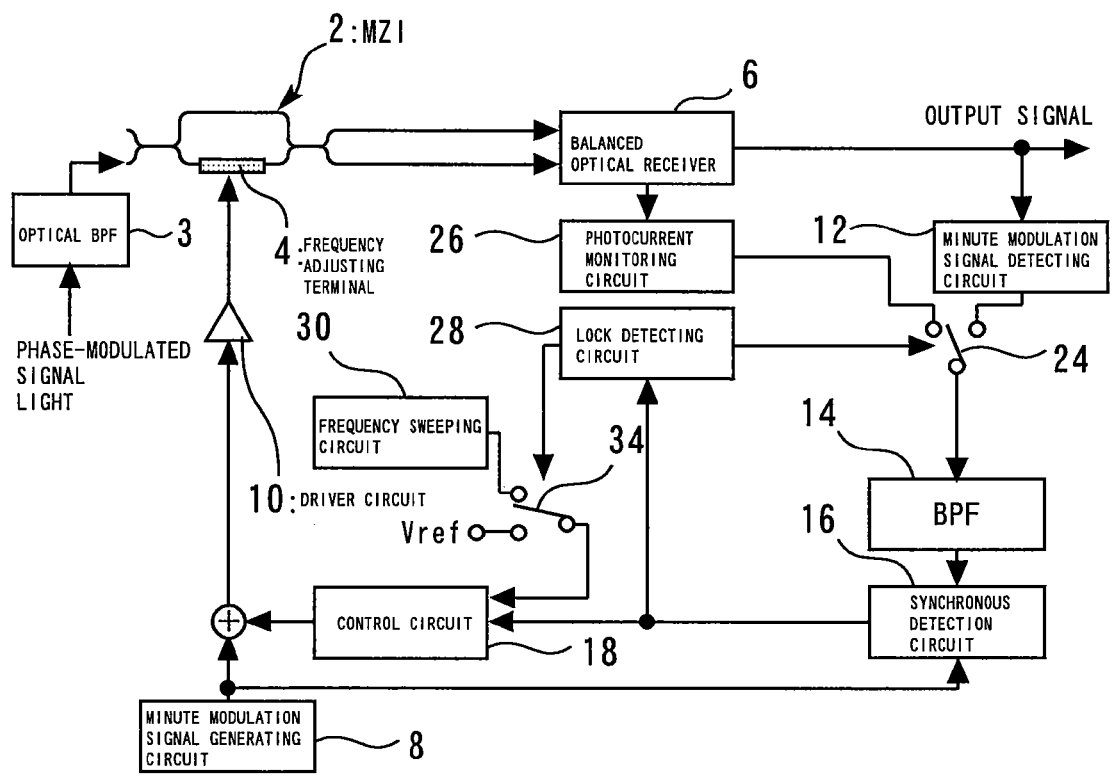
FIG. 12 is a block diagram showing the structure of an optical receiver according to Embodiment 6 of the present invention.

FIG. 12 is a block diagram showing the structure of an optical receiver according to Embodiment 6 of the present invention. In the optical receiver shown in FIG. 12, the same components as in the optical receiver of any one of above embodiments are given the same numerals. Further, the description of the content already described is omitted.

Figure 13:
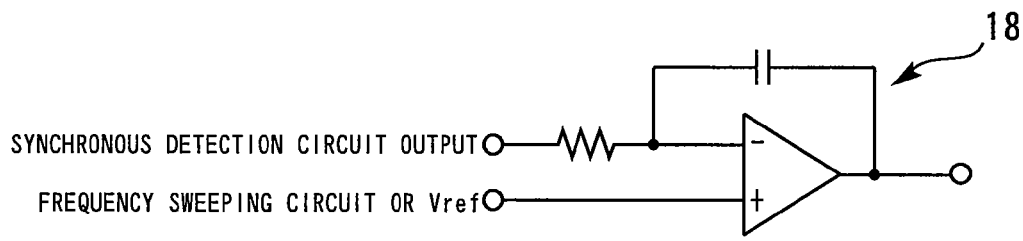
FIG. 13 is a block diagram showing the structure of an integration circuit.

Different points in structure of the optical receiver of the embodiment from that of Embodiment 2 are that an integration circuit as shown in FIG. 13 is used as an error signal detection part of the control circuit 18, and the output of the frequency sweeping circuit 30 is input to its reference voltage input terminal through a switch 34. The integration circuit detects by nature a difference between the output voltage of the synchronous detection circuit and a reference voltage as an error signal, and control is so performed that the difference becomes zero. In the optical receiver of the embodiment, the switch 24 connects photocurrent monitoring circuit 26 to the synchronous detection circuit 16 in the initial stage of frequency pull-in, i.e., in a state in which the frequency lock loop is not locked, and the frequency sweeping circuit 30 largely changes the MZI frequency. This makes it possible to realize a wider pull-in range.

If the lock detecting circuit 28 detects a locked state, the switch 24 is switched from the photocurrent monitoring circuit 26 to the minute modulation signal detecting circuit 12.

Simultaneously, the switch 34 is switched to any reference voltage Vref from the frequency sweeping circuit 30. Thus, the relationship between MZI frequency and carrier frequency is so controlled that the output of the synchronous detection circuit 16 becomes Vref.

Embodiment 7

Figure 14:
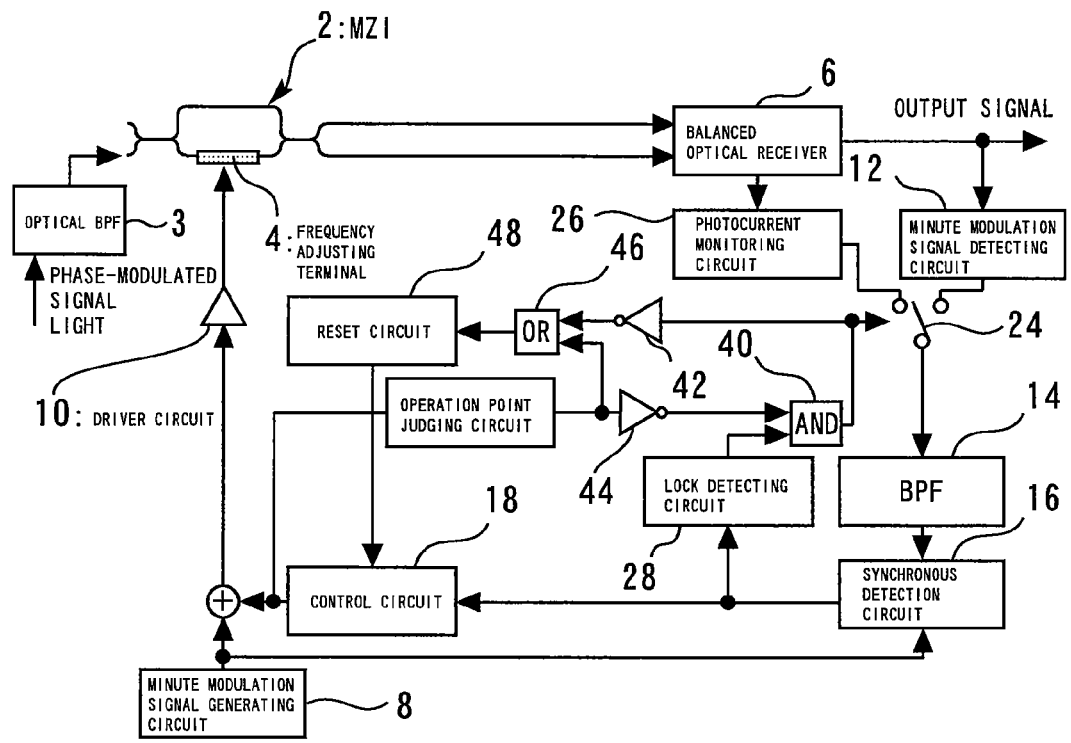
FIG. 14 is a block diagram showing the structure of an optical receiver according to Embodiment 7 of the present invention.

FIG. 14 is a block diagram showing the structure of an optical receiver according to Embodiment 7 of the present invention. In the optical receiver shown in FIG. 14, the same components as those of the optical receiver of any one of above embodiments are given the same numerals. Further, the description of the content already described is omitted.

A different point in structure of the optical receiver of the embodiment from that of Embodiment 2 is that there is provided with a circuit for controlling the operation of the control circuit 18 according to the locked state of the frequency lock loop. This circuit is composed of an operation point judging circuit 50, inverting circuits 42, 44, an AND circuit 40, an OR circuit 46, and a reset circuit 48. The operation point judging circuit 50 monitors the output voltage of the control circuit 18, and if it exceeds a predetermined upper or lower limit value, it is determined that the MZI 2 is operating in a controllable range or it is uncontrollable and it outputs "1". The control circuit 18 according to the embodiment includes a frequency sweeping circuit.

The output of the operation point judging circuit 50 is input to the AND circuit 40 through the inverting circuit 44. The output of the lock detecting circuit 28 is also input to this AND circuit 40. If the operation point judging circuit 50 judges that the MZI 2 falls within the controllable range and the lock detecting circuit 30 detects the lock, a normal lock state is determined and the output of the AND circuit 40 becomes "1". If the AND circuit output becomes "1", the switch 24 is switched from the photocurrent monitoring circuit 26 to the minute modulation signal detecting circuit 12.

The output of the AND circuit 40 is input to the OR circuit 46 through the inverting circuit 42. The output of the operation point judging circuit 50 is also input to this OR circuit 46. The output of the OR circuit 46 is input to the reset circuit 48. In the optical receiver of the embodiment, if the operation point judging circuit 50 judges that the MZI 2 is not within the controllable range (the output of the operation point judging circuit 50 is "1"), or if the OR circuit 46 detects that the lock detecting circuit 30 detects unlock (the output of the AND circuit 40 is "0"), a reset signal is sent from the reset circuit 48 to the control circuit 18, and the frequency sweeping circuit performs frequency pull-in again.

The structure of the optical receiver according to the embodiment can be applied in such a case that the control circuit 18 does not include the frequency sweeping circuit. For example, if the integration circuit as shown in FIG. 13 is used in the control circuit 18, the capacitance of the integration circuit can be short-circuited and open by a reset signal from the reset circuit 48, enabling pull-in of the frequency again.

Embodiment 8

Figure 15:
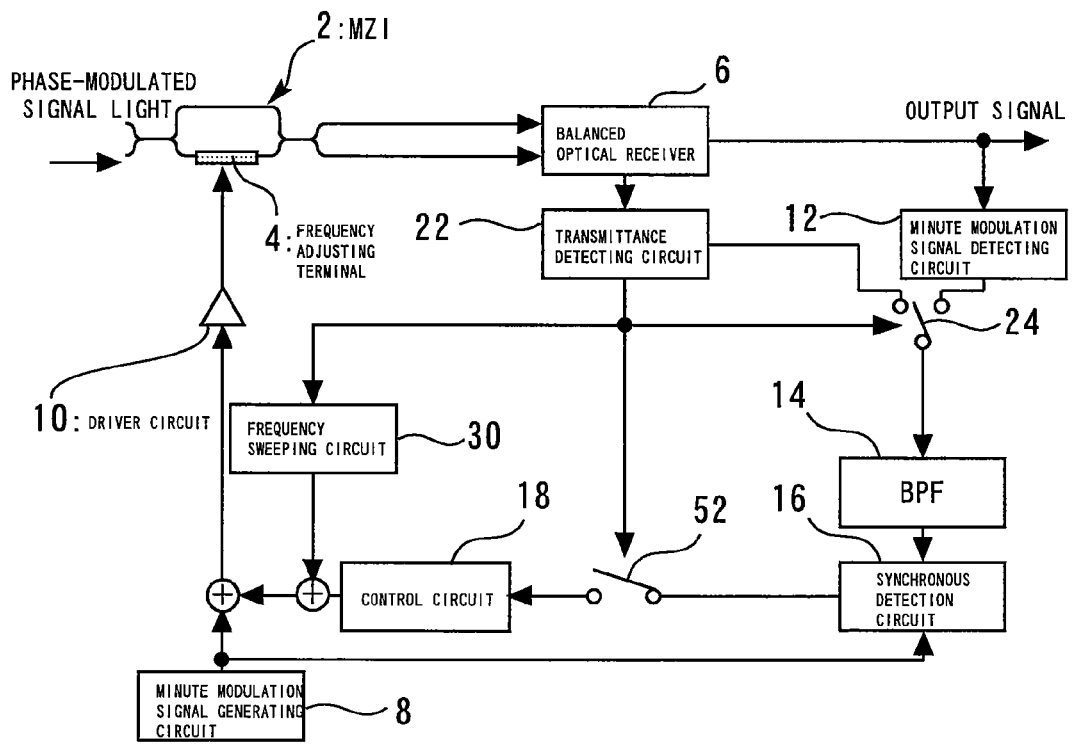
FIG. 15 is a block diagram showing the structure of an optical receiver according to Embodiment 8 of the present invention.

FIG. 15 is a block diagram showing the structure of an optical receiver according to Embodiment 8 of the present invention. In the optical receiver shown in FIG. 15, the same components as those of the optical receiver of any one of the above-described embodiments are given the same reference numerals. Further, the description of the content already described is omitted.

Different points in structure of the optical receiver of the embodiment from that of Embodiment 1 is that a switch (breaking circuit) 52 is provided between the synchronous detection circuit 16 and the control circuit 18 to open or close the frequency lock loop, and the frequency sweeping circuit 30 is provided to add the output of the frequency sweeping circuit 30 in the voltage path of the frequency lock loop. The operation of the switch 52 and the frequency sweeping circuit 30 are controlled by a signal from the transmittance detecting circuit 22.

In the optical receiver of the embodiment, the switch 24 connects the transmittance detecting circuit 22 to the synchronous detection circuit in the initial stage of frequency pull-in, and the switch 52 opens the frequency lock loop. Under this condition, the output of the frequency sweeping circuit 30 is added to the voltage path of the frequency lock loop to sweep MZI frequency.

Then, the transmittance detecting circuit 22 judges that the output port of the MZI 2 becomes a desired state for the carrier frequency, and the switch 22 is switched to the minute modulation signal detecting circuit 12. Simultaneously, a signal is output from the transmittance detecting circuit 22 to the switch 52 to switch the switch 52 in order to close the frequency lock loop. Further, a signal is output from the transmittance detecting circuit 22 to the frequency sweeping circuit 30 concurrently to make the frequency sweeping circuit 30 hold an instantaneous value of the output.

Thus, a wider pull-in range can be realized and the MZI frequency can be exactly matched with the carrier frequency. Further, since the frequency lock loop is open in the initial stage of frequency pull-in, the MZI frequency is uniquely decided only by the frequency sweeping circuit 30. Thus, according to the optical receiver of the embodiment, control of frequency pull-in is easy.

Embodiment 9

Figure 16:
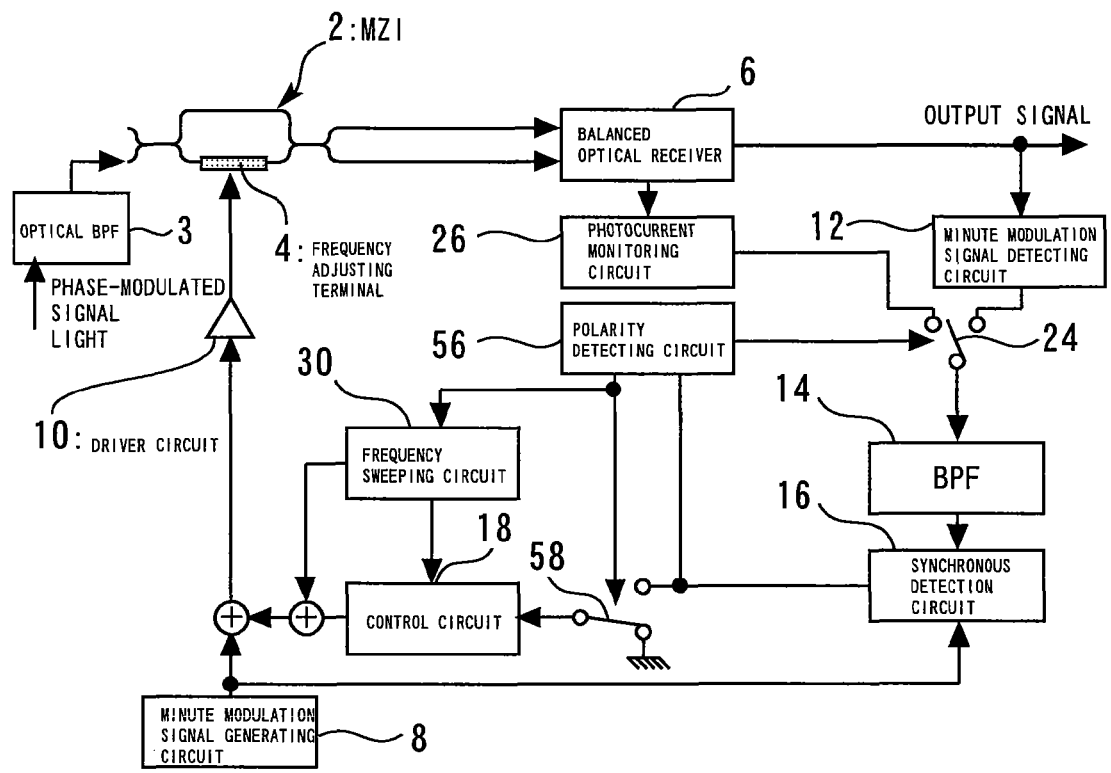
FIG. 16 is a block diagram showing the structure of an optical receiver according to Embodiment 9 of the present invention.

FIG. 16 is a block diagram showing the structure of an optical receiver according to Embodiment 9 of the present invention. In the optical receiver shown in FIG. 16, the same components as those in any one of the above embodiments are given the same reference numerals. Further, the description of the content already described is omitted.

Different points in structure of the optical receiver of the embodiment from that of Embodiment 2 are that a polarity detecting circuit 56 is provided to detect whether a change in the output of the synchronous detection circuit 16 is positive or negative in the frequency sweeping direction, a switch (breaking circuit) 58 is provided between the synchronous detection circuit 16 and the control circuit 18 to open or close the frequency lock loop, and the frequency sweeping circuit 30 is provided to add the output of the frequency sweeping circuit 30 to the voltage path of the frequency lock loop. The operation of the switch 58 and the frequency sweeping circuit 30 is controlled by a signal from the polarity detecting circuit 56.

In the optical receiver of the embodiment, the switch 24 connects the photocurrent monitoring circuit 20 to the synchronous detection circuit 16 in the initial stage of frequency pull-in, and the switch 58 opens the frequency lock loop. When the switch 58 is switched to the open side, the input of the control circuit 18 is short-circuited, or a voltage value to be output upon locking the frequency lock loop is input. Under this condition, the output of the frequency sweeping circuit 30 is added to the voltage path of the frequency lock loop to change the MZI frequency. Thus, the frequency lock loop equivalently makes the error signal be "0" state and no unnecessary offset occurs in the sweeping frequency of the MZI 2.

Thus, while sweeping the MZI frequency, the polarity detecting circuit 56 detects whether a change in the output of the synchronous detection circuit 16 is positive or negative in the frequency sweeping direction. Then, if there is a desired polarity, it is determined that the MZI transmittance is in a desired state for the carrier frequency, so that the switch 24 is switched to the minute signal detecting circuit 12 and the switch 52 closes the frequency lock loop to make the frequency sweeping circuit 30 hold an instantaneous value of the output. This makes is possible to exactly match the MZI frequency with the carrier frequency.

Embodiment 10

Figure 17:
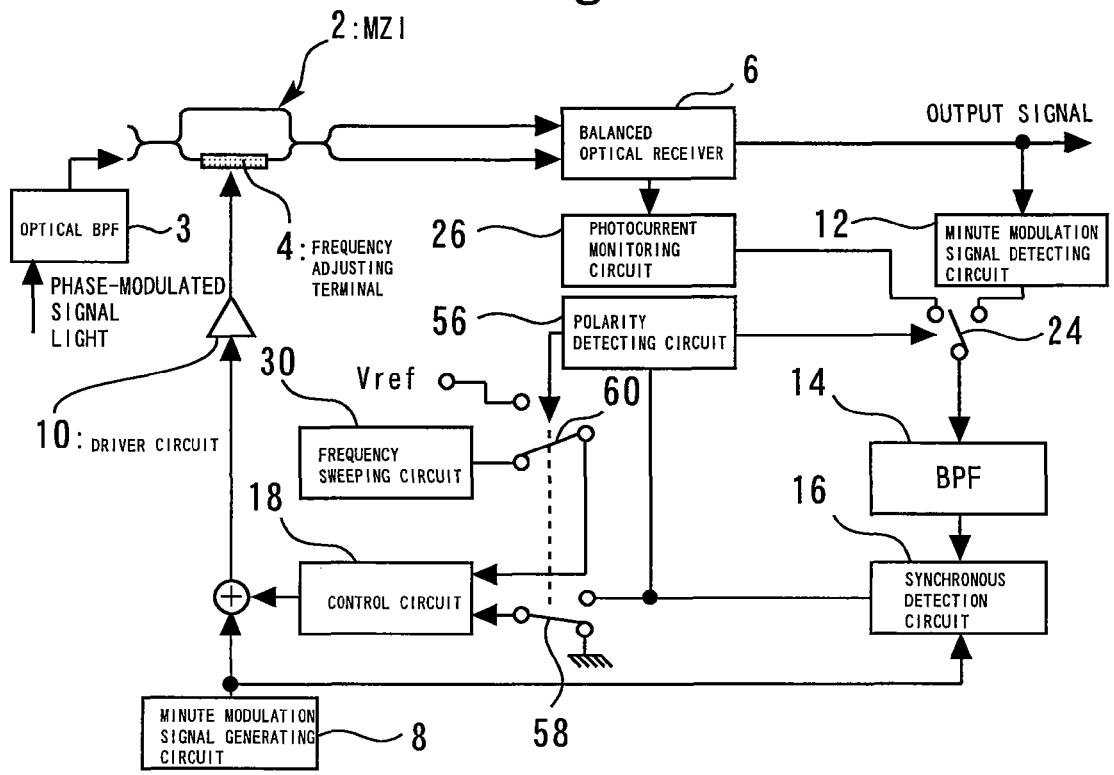
FIG. 17 is a block diagram showing the structure of an optical receiver according to Embodiment 10 of the present invention.

FIG. 17 is a block diagram showing the structure of an optical receiver according to Embodiment 10 of the present invention. In the optical receiver shown in FIG. 17, the same components as in the optical receiver of any one of the above embodiments are given the same numerals. Further, the description of the content already described is omitted.

A different point in structure of the optical receiver of the embodiment from that of Embodiment 9 is that an integration circuit (see FIG. 13) is used for an error signal detection part in the control circuit 18, and the output of the frequency sweeping circuit 30 is input to its voltage input terminal through a switch 60. Like other switches 24 and 58, the operation of the switch 60 is controlled by a signal from the polarity detecting circuit 56.

In the optical receiver of the embodiment, if the polarity detecting circuit 56 judges that a change in the output of the synchronous detection circuit 16 has a desired polarity for the MZI frequency sweeping direction, the switch 60 is switched from the frequency sweeping circuit 30 to a desired reference voltage Vref. Thus, since the control circuit 18 detects a difference between the reference voltage Vref and the output voltage of the synchronous detection circuit 16 as an error signal, not only does the MZI frequency after locked exactly match the carrier frequency, but also a desired difference can be given.

Embodiment 11

Figure 18:
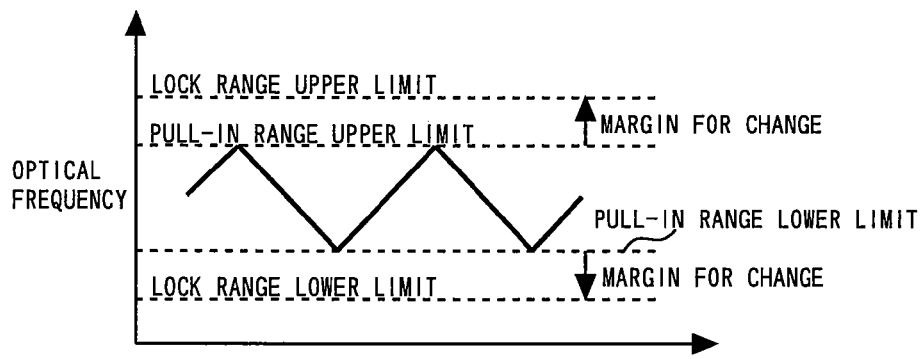
FIG. 18 shows a relationship among the modulation frequency of the phase-modulated signal light, pull-in range, and lock range according to Embodiment 11 of the present invention.

An optical receiver according to Embodiment 11 of the present invention features a relationship between the modulation frequency of the phase-modulated signal light and the pull-in range, and a relationship between the pull-in range and the lock range. FIG. 18 shows a relationship among the modulation frequency, pull-in range, and lock range in the optical receiver of the embodiment. As shown in FIG. 18, in the optical receiver of the embodiment, the pull-in range is set wider than the modulation frequency of the phase-modulated signal light (in case of a phase modulation of 40 Gbit/s, it is equal to or more than 40 GHz), and the lock range is set, for pull-in range, to have a margin equal to or more than an assumed variation. The cause of the variation in the pull-in range is a phenomenon that a gap occurs between the carrier frequency and the MZI frequency after completion of frequency pull-in, which includes a change in LD oscillation wavelength, change in temperature of the MZI 2, etc.

Since the pull-in range is set wider than the modulation frequency of the phase-modulated signal light, lock to any carrier frequency is possible. Further, since the lock range is made wider by an amount of change than the pull-in range, a change in frequency after locked can be traced. The setting of the pull-in range is easily carried out by setting a frequency sweeping amplitude in such a manner that the amount of change of the MZI frequency becomes equal or more than the modulation frequency. Further, the setting of the lock range is carried out by setting the controllable range of the control circuit wider than the frequency sweeping amplitude by an assumed compensating amount of change.

Figure 19:
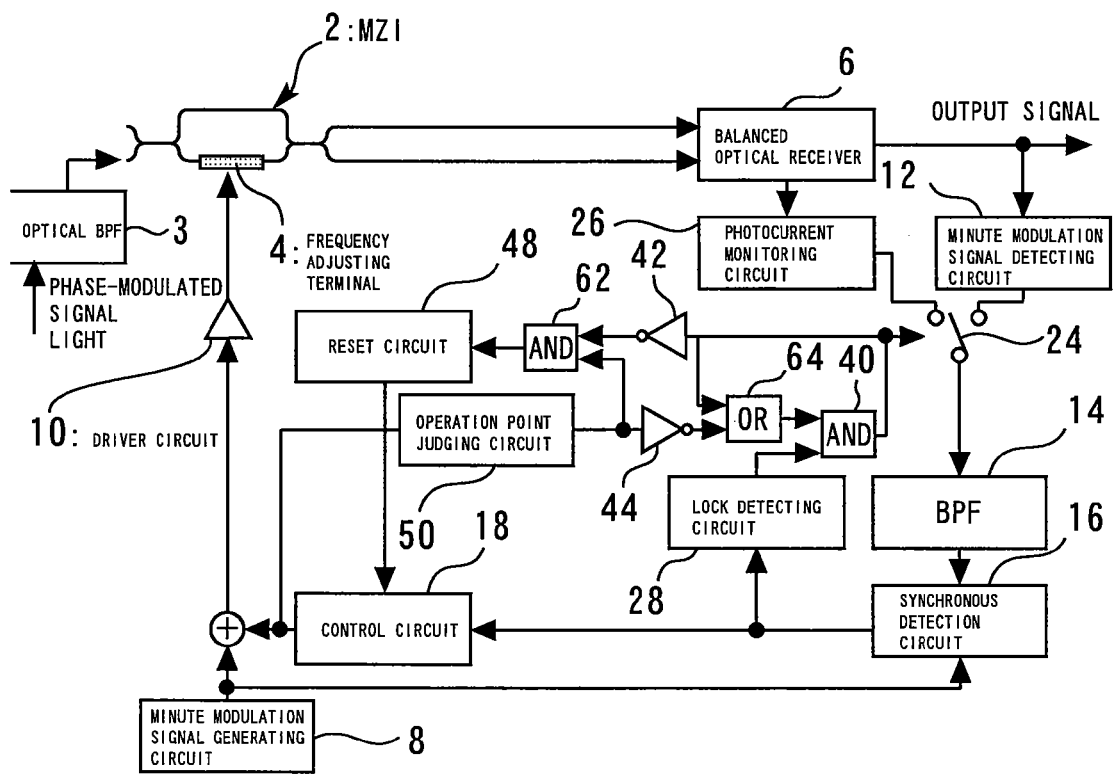
FIG. 19 is a block diagram showing the structure of an optical receiver according to Embodiment 11 of the present invention.

FIG. 19 is a block diagram showing the structure of the optical receiver of the embodiment. In the optical receiver shown in FIG. 19, the same components as in the optical receiver of any one of the above embodiments are given the same numerals. Further, the description of the content already described is omitted.

Figure 20:
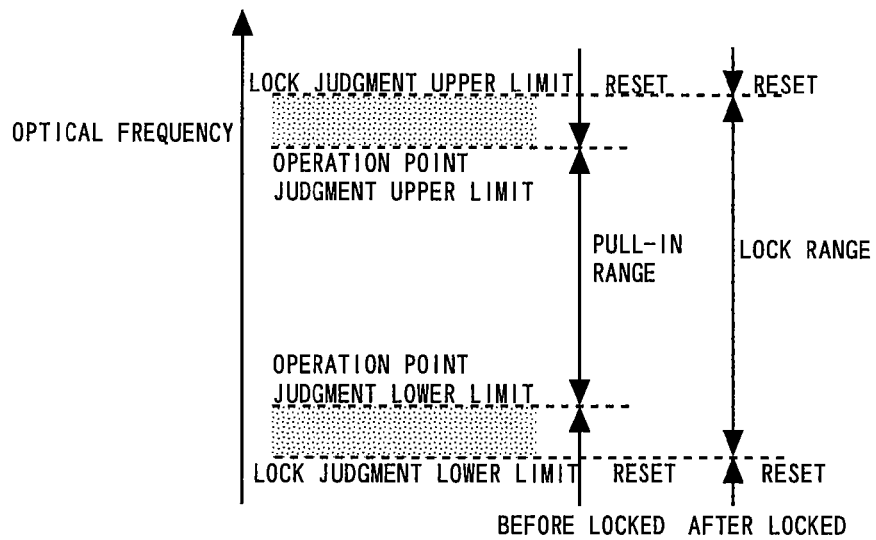
FIG. 20 shows settings of an operation point judging range and a lock judging range according to Embodiment 12 of the present invention.

Different points in structure of the optical receiver of the embodiment from that of Embodiment 7 are that an AND circuit 62 is arranged instead of the OR circuit 46 in Embodiment 5, a new OR circuit 64 is provided between the inverting circuit 44 and the AND circuit 40, the output of the inverting circuit 44 and the output of the AND circuit 40 are input to the OR circuit 64, and its output is input to the AND circuit 40. Further, in the optical receiver of the embodiment, a frequency range judged by the operation point judging circuit 50 to be a normal control range as shown in FIG. 20 is set narrower than a frequency range judged by the lock detecting circuit 28 to be the lock.

According to the circuit structure shown in FIG. 19, if the normal operation point and lock are taken, it is determined that frequency pull-in is completed and the lock is performed. In the other states, the reset signal is output from the reset circuit 48 to the control circuit 18, and frequency pull-in is performed again by the frequency sweeping circuit. Either of inputs of the AND circuit 40 is the output of the lock detecting circuit 28, and the other is a logical sum (output of the OR circuit 64) of the output of the AND circuit 40 and the inverted output of the operation point judging circuit 50. While the output of the AND circuit 40 is "1(lock)", the output of the AND circuit 62 is not reversed even if the operation point judging circuit 50 judges beyond the operation range, and the reset signal is not output. Thus, in the areas of halftone dot meshing in FIG. 20, the lock range becomes wider than the pull-in range, a change in frequency after locked can be traced.

Embodiment 12

Figure 21:
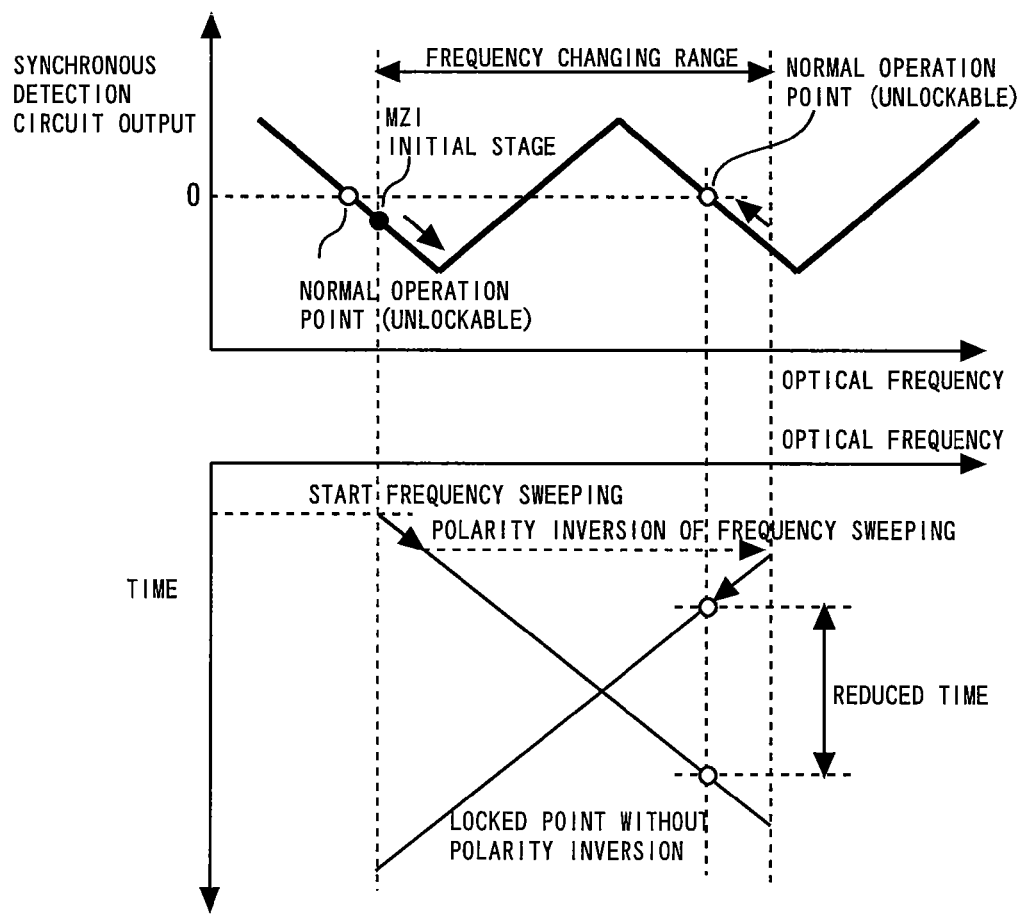
FIG. 21 is a diagram for explaining the operation principle of frequency sweeping control according to Embodiment 12 of the present invention.

The optical receiver according to Embodiment 12 of the present invention features control upon frequency sweeping. FIG. 21 is a diagram for explaining the operation principle of frequency sweeping control according to the embodiment. The frequency sweeping control of the embodiment can be applied to any structure of the above-mentioned embodiments.

In the example shown in FIG. 21, the normal operation points are located near the upper limit (lockable) and lower limit (unlockable) in the frequency changing range of the frequency lock loop, and the initial stage of the MZI is located near the lower limit of the pull-in range. When the MZI transmittance is matched with a normal operation point by means of frequency sweeping, if the frequency sweeping is started from the initial state, it can be locked after going to the last of the frequency changing range. However, as mentioned above, since the MZI frequency sweeping involves lock detection and polarity judgment of the synchronous detection circuit, a low-speed signal is used for the MZI frequency sweeping. The wider the sweeping frequency range, the longer the time is required. In such a case, if the frequency sweeping is started from the upper limit of the frequency changing range, the time up to lock can be considerably shortened.

In the example shown in FIG. 21, since the synchronous detection output immediately after the frequency sweeping has a negative value with a negative gradient, it can be determined that the MZI initial state is near an unlockable operation point. Therefore, the polarity of the frequency sweeping output is reversed to restart the sweeping from the variable range upper limit, so that the sweeping time can be reduced. Further, when the frequency sweeping control is applied to the structure shown in FIG. 19, if the operation point judging circuit 50 Judges to be beyond the control rage, a reset signal is so transmitted that the output of the control circuit 18 is output on the opposite side, enabling the lock at an operation point in the control range.

Embodiment 13

Figure 22:
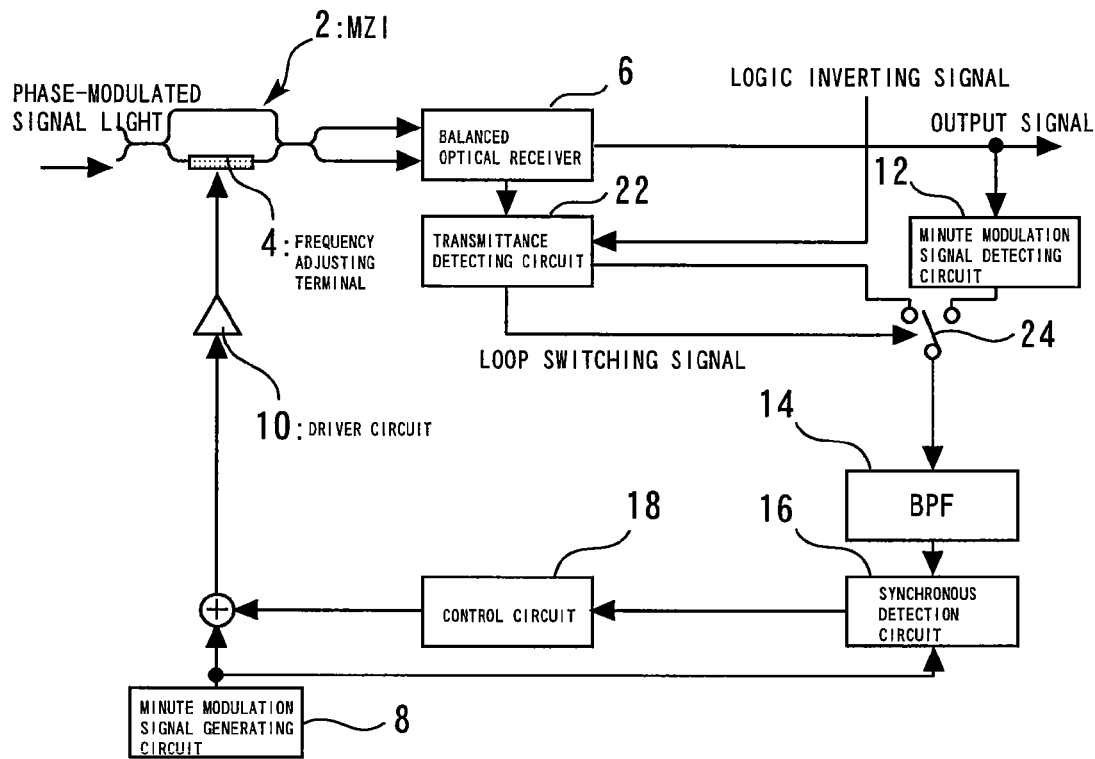
FIG. 22 is a block diagram showing the structure of an optical receiver according to Embodiment 13 of the present invention.

FIG. 22 is a block diagram showing the structure of an optical receiver according to Embodiment 13 of the present invention. In the optical receiver shown in FIG. 22, the same components as in the optical receiver of any one of the above embodiments are given the same numerals. Further, the description of the content already described is omitted.

The optical receiver of the embodiment is based on the structure of Embodiment 1 and features that the logic inversion of the transmittance detecting circuit 22 is performed by a logical inverting signal from the outside. Thus, the transmittance of the output ports of the MZI 2 can be set to a desired state such as constructive or destructive. Further, even if a different modulation system is used such as RZ-DPSK and CSRZ-DPSK, the phase-modulated light can be received merely by setting the logical inverting signal without changing the structure of the optical receiver.

Embodiment 14

Figure 23:
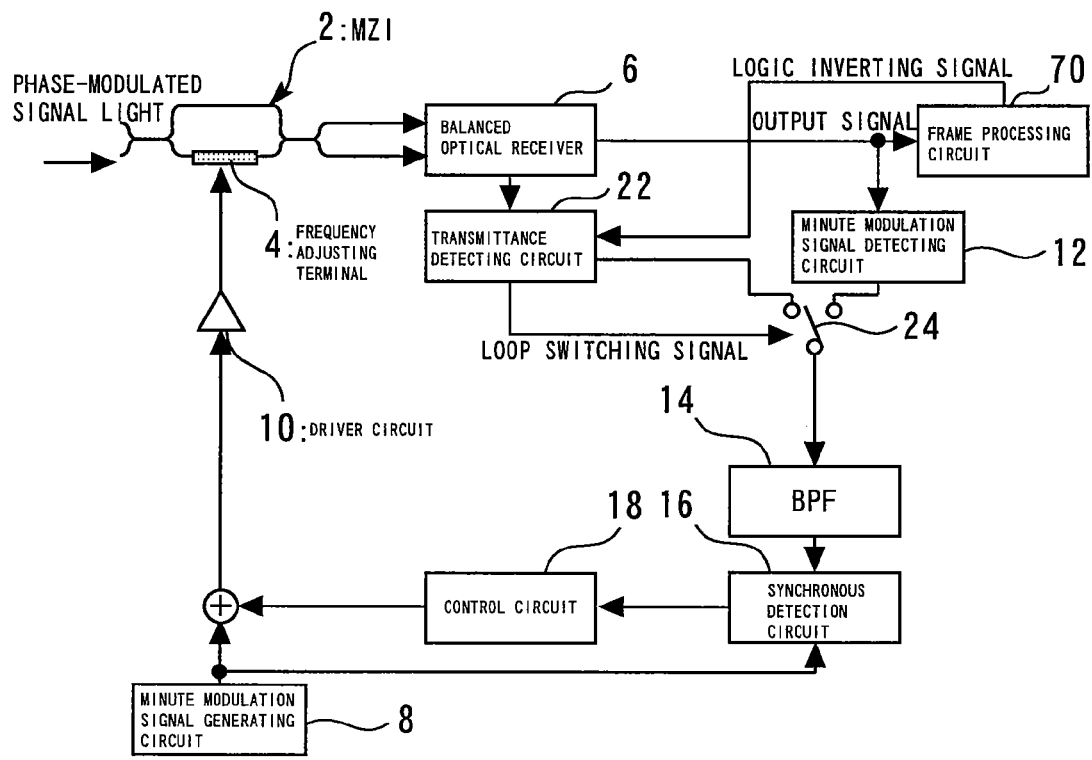
FIG. 23 is a block diagram showing the structure of an optical receiver according to Embodiment 14 of the present invention.

FIG. 23 is a block diagram showing the structure of an optical receiver according to Embodiment 14 of the present invention. In the optical receiver shown in FIG. 23, the same components as in the optical receiver of any one of the above embodiments are given the same numerals. Further, the description of the content already described is omitted.

A different point in structure of the optical receiver of the embodiment from that of Embodiment 13 is that the logical inverting signal is generated in a frame processing circuit 70 arranged after the balanced optical receiver 6. The frame processing circuit 70 uses a clock the phase of which is phase synchronized with the output signal of the optical receiver to detect a specific bit stream as a frame start demarcation point from the output signal column in order to perform frame synchronization.

If the spectrum of the phase-modulated signal light is deformed more than assumed, a change occurs in the detection result of the transmittance, and there is a danger to lock at a wrong operation point for the reasons that the transmitter causes a deterioration in the transmittance detecting circuit 22, or the frequency of an optical filter arranged in the transmission path is sifted from the carrier frequency. If it is locked at a wrong operation point, the optical receiver output is subjected to logic inversion. If the logic inversion occurs, the frame processing circuit 70 cannot detect a frame start demarcation point and becomes LOF (Loss of Flame) state irrespective of that the clock whose phase is synchronized with the received signal is obtained.

To avoid such a state, if LOF is detected by the frame processing circuit 70 upon establishing phase synchronization in the optical receiver of the embodiment, the output of the transmittance detecting circuit 22 is reversed or rewrites the polarity of the transmittance detecting circuit 22 to perform frequency pull-in again. Thus, even if the spectrum of the phase-modulated signal light is deformed more than assumed, it can be locked at a normal operation point.

Embodiment 15

Figure 24:
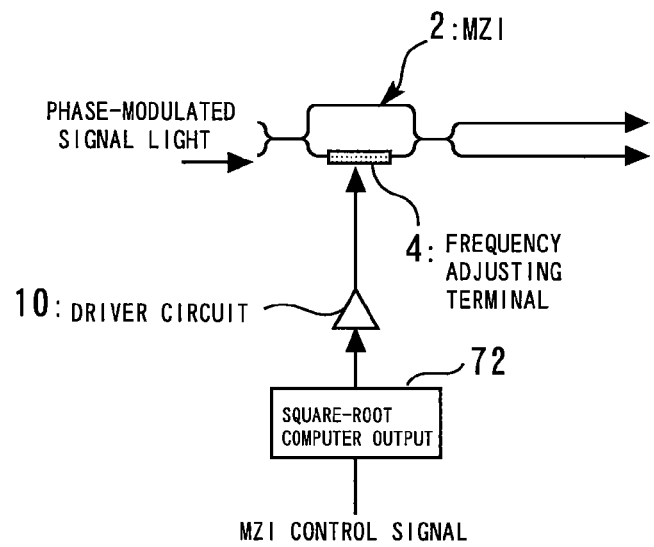
FIG. 24 is a block diagram showing the structure of an optical receiver according to Embodiment 15 of the present invention.

FIG. 24 is a block diagram showing the structure of an optical receiver according to Embodiment 15 of the present invention. FIG. 24 shows features of the optical receiver of the embodiment, and the other parts are omitted. The structure of any one of the above-mentioned embodiments can be applied to the structure of the other parts that are not shown in FIG. 24. In FIG. 24, the same components as in the optical receiver of any one of the above embodiments are given the same reference numerals. Further, the description of the content already described is omitted.

The optical receiver of the embodiment is provided with a square-root circuit 72 before the driver circuit 10. This square-root circuit 72 computes the square root of the MZI control voltage and the driver circuit 10 controls the frequency of the MZI 2 with current corresponding to the computing result.

Figure 25:
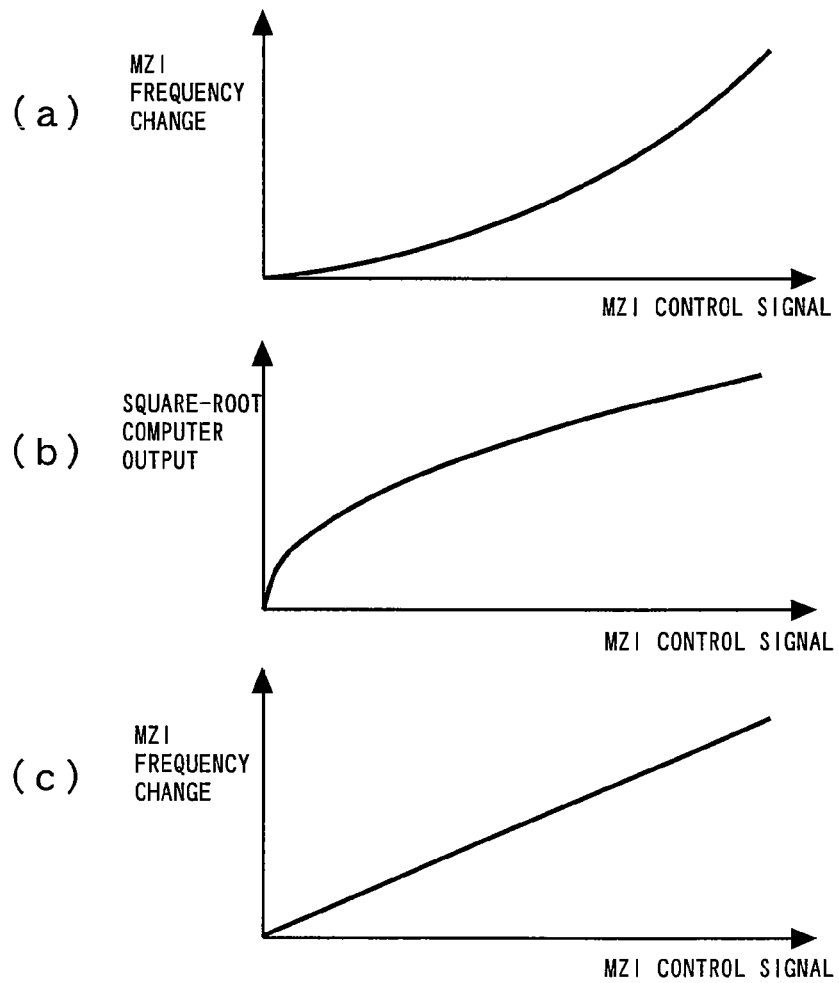
FIG. 25 is a diagram for explaining the effect of an optical receiver shown in FIG. 24.

Since the MZI frequency is changed in proportion to 2 power of the driving current of the frequency adjusting terminal 4, if the current proportional to the control voltage is the driving current of the frequency adjusting terminal 4, the MZI frequency is changed in proportion to 2 power of the control voltage (MZI control signal) as shown in FIG. 25(*a*). Therefore, the frequency changing efficiency, i.e., the loop gain is changed according to the absolute value of the control voltage.

On the other hand, since the square-root circuit 72 is used in the optical receiver of the embodiment, the MZI driving current (square-root circuit output) is proportional to the square root of the control voltage as shown in FIG. 25(*b*). As a result, as shown in FIG. 25(*c*), the MZI frequency linearly responds to the control voltage to obtain constant loop gain irrespective of the MZI control voltage.

Embodiment 16

Figure 26:
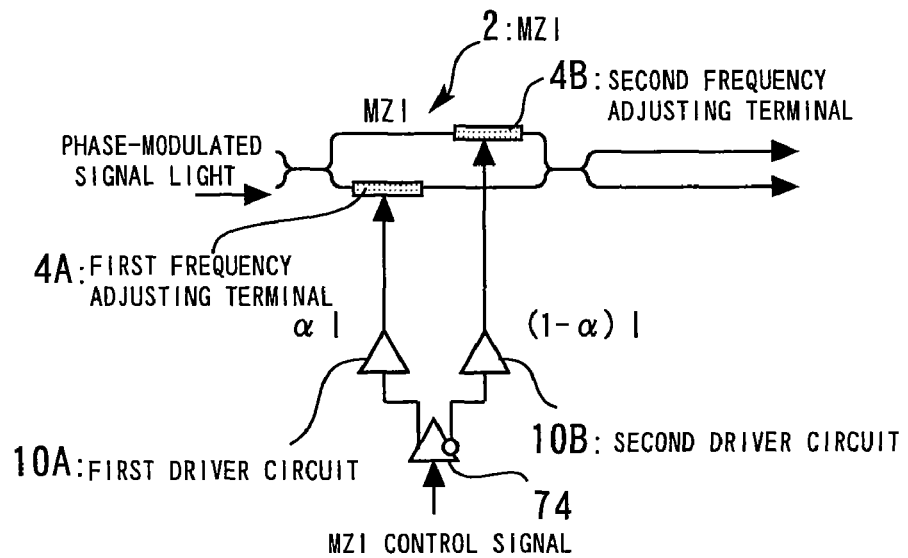
FIG. 26 is a block diagram showing the structure of an optical receiver according to Embodiment 16 of the present invention.

FIG. 26 is a block diagram showing the structure of an optical receiver according to Embodiment 16 of the present invention. FIG. 26 shows features of the optical receiver of the embodiment, and the other parts are omitted. The structure of any one of the above-mentioned embodiments can be applied to the structure of the other parts that are not shown in FIG. 26. In FIG. 26, the same components as in the optical receiver of any one of the above embodiments are given the same numerals. Further, the description of the content already described is omitted.

The optical receiver of the embodiment is provided with frequency adjusting terminals 4A, 4B for the two optical waveguides of the MZI 2, respectively. Each of the frequency adjusting terminals 4A, 4B is driven by a different driver circuit. In other words, the first frequency adjusting terminal 4A is driven by a first driver circuit 10A, and the second frequency adjusting terminal 4B is driven by a second driver circuit 10B. An MZI control signal is input from a differential circuit 74 to each of the driver circuits 10A, 10B, respectively.

The MZI control signal is converted to a differential signal by the differential circuit 74 and input to each of the driver circuits 10A, 10B. Since the two driver circuits 10A, 10B operate differentially, the sum of both the MZI driving currents is constant. If the sum of the driving currents is 1, and the rate of current flowing into the first driver circuit 10A is a, the driving current of the first driver circuit 10A is a1, and the driving current of the second driver circuit 10B is (1−a)I.

Figure 27:
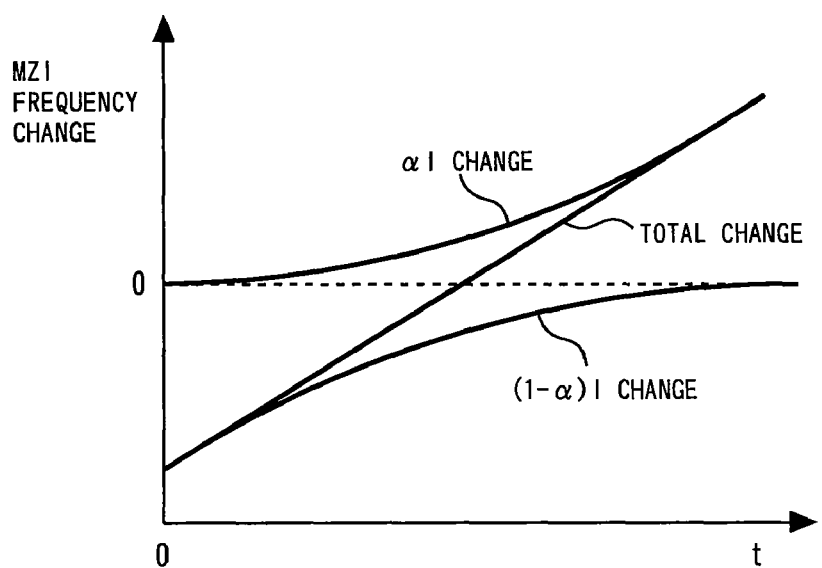
FIG. 27 is a diagram for explaining the effect of an optical receiver shown in FIG. 26.

The frequency change of the MZI 2 obtained by current driving each of the driver circuits 10A, 10B can be represented using a variable a as shown in FIG. 27. The frequency changing direction by the driving current a1 and the frequency changing direction by the driving current (1−a)I is reversed, so that when one becomes the maximum frequency change, the other becomes frequency change of zero. The total frequency change is the sum of both, and a component proportional to 2 power of the driving current gets balanced out. As a result, a frequency change proportional to a control voltage (MZI control signal) can be obtained.

Others

While the embodiments of the present invention have been described, the present invention is not limited to the embodiments, and modification and changes are possible without departing from the spirit of the present invention.

The invention claimed is:

1. An optical receiver for receiving differential coded phase-modulated signal light, comprising:
    a Mach-Zehnder interferometer for converting the phase-modulated signal light to intensity modulation signal light;
    a balanced optical receiver for photoelectrically converting the intensity modulation signal light from two output ports of the Mach-Zehnder interferometer to output a difference between converted electric signals;
    a minute modulation signal generating circuit for minutely modulating the transmittance of the Mach-Zehnder interferometer at a low frequency;
    a minute modulation signal detecting circuit for detecting a minute modulation signal included in the signal output from the balanced optical receiver;
    a transmittance detecting circuit for judging, from the signal output from the balanced optical receiver, whether the transmittance of the two output ports of the Mach-Zehnder interferometer is maximum or minimum at a carrier frequency of the phase-modulated signal light;
    a synchronous detection circuit for synchronously detecting the minute modulation signal included in the signal output from the balanced optical receiver with the signal generated from the minute modulation signal generating circuit;
    a switch for switching the minute modulation signal detecting circuit and the transmittance detecting circuit to connect it to the synchronous detection circuit; and
    a control circuit for detecting the signal output from the synchronous detection circuit as a shift amount between the frequency at which the transmittance of the Mach-Zehnder interferometer becomes maximum or minimum, and the carrier frequency to feed back the transmittance of the Mach-Zehnder interferometer to make the shift amount zero or a predetermined value, wherein
    the switch is set to connect the transmittance detecting circuit to the synchronous detection circuit in an initial stage of frequency pull-in, and if the transmittance detecting circuit detects that the transmittance of the Mach-Zehnder interferometer at the carrier frequency becomes a desired transmittance, the connection of the switch is switched from the transmittance detecting circuit to the minute modulation signal detecting circuit.

2. The optical receiver according to claim 1, wherein
    the transmittance detecting circuit comprises a lock detecting circuit for detecting, from the output of the synchronous detection circuit, a locked state of the carrier frequency and a frequency at which the transmittance of the Mach-Zehnder interferometer becomes maximum or minimum, and
    if the lock detecting circuit detects that the frequency at which the transmittance of the Mach-Zehnder interferometer becomes maximum or minimum is locked at the carrier frequency, the connection of the switch is switched from the transmittance detecting circuit to the minute modulation signal detecting circuit.

3. The optical receiver according to claim 1, wherein the transmittance detecting circuit comprises a light bandpass filter for band limiting a spectrum of the phase-modulated signal light, and a photocurrent monitoring circuit for monitoring photocurrent flowing into both or either of two light-receiving elements included in the balanced optical receiver.

4. The optical receiver according to claim 1, further comprising
    a frequency sweeping circuit for sweeping a pass-band frequency of the Mach-Zehnder interferometer by adding a low-frequency signal to a control signal transmitted from the control circuit to the Mach-Zehnder interferometer,
    wherein the frequency sweeping circuit performs sweeping until the transmittance of the Mach-Zehnder interferometer at the carrier frequency becomes a desired transmittance, and if the transmittance of the Mach-Zehnder interferometer at the carrier frequency becomes the desired transmittance, the sweeping by the frequency sweeping circuit is stopped.

5. The optical receiver according to claim 1, further comprising
    a frequency sweeping circuit for sweeping a pass-band frequency of the Mach-Zehnder interferometer by inputting a low-frequency signal to a reference signal terminal of the control circuit,
    wherein the frequency sweeping circuit performs sweeping until the transmittance of the Mach-Zehnder interferometer at the carrier frequency becomes a desired transmittance, and if the transmittance of the Mach-Zehnder interferometer at the carrier frequency becomes the desired transmittance, the sweeping by the frequency sweeping circuit is stopped.

6. The optical receiver according to claim 4, further comprising a second control circuit for alternately switching the connection of the switch on condition that the pass-band frequency of the Mach-Zehnder interferometer is swept by the frequency sweeping circuit in the initial stage of frequency pull-in to alternately monitor a shift between the frequency, at which the transmittance of the Mach-Zehnder interferometer becomes maximum or minimum, and the carrier frequency, and a signal of the synchronous detection circuit upon connecting the minute modulation signal detecting circuit, and the frequency at which no shift occurs is used as a starting point to count the number of times the signal of the synchronous detection circuit becomes zero or a predetermined value, and if it reaches predetermined times, the frequency sweeping circuit stops sweeping and the connection of the switch is fixed to the minute modulation signal detecting circuit.

7. The optical receiver according to claim 4, further comprising a second control circuit for connecting the connection of the switch to a photocurrent monitoring circuit included in the transmittance detecting circuit on condition that the passband frequency of the Mach-Zehnder interferometer is swept by the frequency sweeping circuit in the initial stage of frequency pull-in, to monitor a sift between the frequency at which the transmittance of the Mach-Zehnder interferometer becomes maximum or minimum and the carrier frequency, and if no shift is detected in the frequency, the connection of the switch is switched to the minute modulation signal detecting circuit to count the number of times the signal of the synchronous detection circuit becomes zero or a predetermined value on condition that sweeping is continued, and if it becomes predetermined times, the sweeping by the frequency sweeping circuit is stopped.

8. The optical receiver according to claim 4, further comprising
an operation point judging circuit for judging whether a signal value of the control signal transmitted from the control circuit to the Mach-Zehnder interferometer exceeds a predetermined upper or lower value,
wherein after completion of pull-in of the pass-band frequency of the Mach-Zehnder interferometer in the control circuit, if it is detected that the signal value exceeds the upper value or the lower value by means of the operation point judging circuit, the pull-in of the control circuit is restarted.

9. The optical receiver according to claim 4, further comprising
a breaking circuit for blocking input of a signal from the synchronous detection circuit to the control circuit,
wherein the input of the signal from the synchronous detection circuit to the control circuit is blocked until transmittance of the Mach-Zehnder interferometer at the carrier frequency becomes a desired transmittance, and if the transmittance of the Mach-Zehnder interferometer at the carrier frequency becomes the desired transmittance, the input of the signal from the synchronous detection circuit to the control circuit is released from blocking.

10. The optical receiver according to claim 4, wherein
the pull-in range when the frequency sweeping circuit sweeps the pass-band frequency of the Mach-Zehnder interferometer is set wider than the modulation frequency of the phase-modulated signal light, and
the lock range that the control circuit is able to lock the transmittance of the Mach-Zehnder interferometer is set wider than the pull-in range.

11. The optical receiver according to claim 1, wherein the transmittance detecting circuit performs logic inversion in accordance with an external command.

12. The optical receiver according to claim 1, further comprising
a frequency adjusting terminal provided in the Mach-Zehnder interferometer to change the transmittance of the Mach-Zehnder interferometer according to an input current value,
a square-root circuit for extracting the square root of the signal value of the control signal transmitted from the control circuit to the Mach-Zehnder interferometer, and
a driver circuit for converting a driving current of the computed value of the square-root circuit to a driving current to input it to the frequency adjusting terminal.

13. The optical receiver according to claim 1, further comprising
a first frequency adjusting terminal provided in the first optical waveguide of the Mach-Zehnder interferometer to change the transmittance of the Mach-Zehnder interferometer according to an input current value,
a second frequency adjusting terminal provided in the second optical waveguide of the Mach-Zehnder interferometer to change the transmittance of the Mach-Zehnder interferometer according to an input current value,
a differential circuit for converting, to a differential signal, the control signal transmitted from the control circuit to the Mach-Zehnder interferometer,
a first driver circuit for converting a first differential signal obtained from the differential circuit to a driving current to input it to the first frequency adjusting terminal, and
a second driver circuit for converting a second differential signal obtained from the differential circuit to input it to the second frequency adjusting terminal.

* * * * *